US010489692B2

(12) United States Patent
Bhardwaj et al.

(10) Patent No.: US 10,489,692 B2
(45) Date of Patent: Nov. 26, 2019

(54) ITEM RECOMMENDATIONS USING IMAGE FEATURE DATA

(71) Applicant: eBay Inc., San Jose, CA (US)

(72) Inventors: Anurag Bhardwaj, Sunnyvale, CA (US); Wei Di, San Jose, CA (US); Vignesh Jagadeesh, Santa Clara, CA (US); Robinson Piramuthu, Oakland, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 164 days.

(21) Appl. No.: 15/661,722

(22) Filed: Jul. 27, 2017

(65) Prior Publication Data

US 2017/0323185 A1 Nov. 9, 2017

Related U.S. Application Data

(63) Continuation of application No. 15/065,122, filed on Mar. 9, 2016, now Pat. No. 9,721,192, which is a
(Continued)

(51) Int. Cl.
*G06K 9/46* (2006.01)
*G06K 9/66* (2006.01)
(Continued)

(52) U.S. Cl.
CPC .......... *G06K 9/66* (2013.01); *G06F 16/24578* (2019.01); *G06F 16/532* (2019.01);
(Continued)

(58) Field of Classification Search
CPC ............... G06T 7/408; G06T 7/0081; G06T 2207/10024; G06K 9/4652;
(Continued)

(56) References Cited

U.S. PATENT DOCUMENTS

| 4,972,495 A | 11/1990 | Blike et al. |
| 6,985,628 B2 | 1/2006 | Fan |

(Continued)

FOREIGN PATENT DOCUMENTS

| AU | 2015271906 B2 | 3/2017 |
| KR | 10-2001-0089462 A | 10/2001 |

(Continued)

OTHER PUBLICATIONS

Notice of Allowance received for Korean Patent Application No. 10-2014-7011688, dated Nov. 30, 2015, 4 pages (1 pages of English Translation and 3 pages of Official Copy).

(Continued)

*Primary Examiner* — Duy M Dang
(74) *Attorney, Agent, or Firm* — Schwegman Lundberg & Woessner, P.A.

(57) ABSTRACT

An apparatus and method to facilitate providing recommendations are disclosed herein. A networked system receives a query image, and performs image processing to extract a color histogram of an item depicted in the query image. The networked system identifies a dominant color of the item, whereby the dominant color is a color that is present on a most spatial area of the item relative to any other color of the item. The color histogram of the item is compared with a color histogram of an image of each of a plurality of available items, or the dominate color of the item is compared with a dominate color of the image of each of a plurality of available items. Based on the comparing, the networked system identifies item recommendations of the available items that closely match the item depicted in the query image, and the item recommendations are presented.

20 Claims, 27 Drawing Sheets

Related U.S. Application Data continuation of application No. 14/218,772, filed on Mar. 18, 2014, now Pat. No. 9,311,666, which is a continuation of application No. 13/631,839, filed on Sep. 28, 2012, now Pat. No. 8,737,728.

(60) Provisional application No. 61/541,970, filed on Sep. 30, 2011, provisional application No. 61/554,890, filed on Nov. 2, 2011, provisional application No. 61/567,050, filed on Dec. 5, 2011.

(51) Int. Cl.
| | |
|---|---|
| *G06F 16/532* | (2019.01) |
| *G06F 16/583* | (2019.01) |
| *G06F 16/58* | (2019.01) |
| *G06F 16/9535* | (2019.01) |
| *G06F 16/2457* | (2019.01) |
| *G06Q 30/06* | (2012.01) |
| *G06K 9/62* | (2006.01) |
| *G06T 7/13* | (2017.01) |
| *G06T 7/90* | (2017.01) |
| *G06T 7/41* | (2017.01) |

(52) U.S. Cl.
CPC ........ *G06F 16/583* (2019.01); *G06F 16/5838* (2019.01); *G06F 16/5866* (2019.01); *G06F 16/9535* (2019.01); *G06K 9/4642* (2013.01); *G06K 9/4647* (2013.01); *G06K 9/4652* (2013.01); *G06K 9/6215* (2013.01); *G06K 9/6217* (2013.01); *G06Q 30/0629* (2013.01); *G06Q 30/0631* (2013.01); *G06Q 30/0643* (2013.01); *G06T 7/13* (2017.01); *G06T 7/41* (2017.01); *G06T 7/90* (2017.01); *G06T 2207/10024* (2013.01)

(58) Field of Classification Search
CPC ........... G06F 17/3025; G06F 17/30905; G06F 17/30749; G06F 17/30761; G06F 17/30522; G06F 17/3053; G06F 17/30554; G06F 17/30643; G06F 17/30035; G06F 17/30277; G06F 17/30244; G06F 17/30259; G06F 17/30256; G06F 17/30663; G06F 17/30687; G06F 17/30864; G06F 17/30017

See application file for complete search history.

(56) References Cited

U.S. PATENT DOCUMENTS

| | | |
|---|---|---|
| 8,103,742 B1 | 1/2012 | Green |
| 8,489,627 B1 | 7/2013 | Brandt |
| 8,577,131 B1 | 11/2013 | Li et al. |
| 8,737,728 B2 | 5/2014 | Bhardwaj et al. |
| 8,737,729 B2 | 5/2014 | Bhardwaj et al. |
| 8,798,363 B2 | 8/2014 | Bhardwaj et al. |
| 8,908,962 B2 | 12/2014 | Bhardwaj et al. |
| 9,213,991 B2 | 12/2015 | Bhardwaj et al. |
| 9,235,859 B2 | 1/2016 | Bhardwaj et al. |
| 9,311,666 B2 | 4/2016 | Bhardwaj et al. |
| 9,607,248 B2 | 3/2017 | Bhardwaj et al. |
| 9,721,192 B2 | 8/2017 | Bhardwaj et al. |
| 9,886,653 B2 | 2/2018 | Bhardwaj et al. |
| 10,185,899 B2 | 1/2019 | Bhardwaj et al. |
| 2002/0169805 A1 | 11/2002 | Edge |
| 2003/0048928 A1 | 3/2003 | Yavitz |
| 2004/0197022 A1 | 10/2004 | Gonsalves |
| 2004/0221006 A1 | 11/2004 | Gopalan et al. |
| 2004/0252303 A1 | 12/2004 | Giorgianni et al. |
| 2005/0261990 A1 | 11/2005 | Gocht et al. |
| 2006/0020482 A1 | 1/2006 | Coulter |
| 2007/0168357 A1 | 7/2007 | Mo |
| 2008/0056564 A1 | 3/2008 | Lindbloom |
| 2008/0097975 A1 | 4/2008 | Guay et al. |
| 2008/0177640 A1 | 7/2008 | Gokturk et al. |
| 2009/0313239 A1 | 12/2009 | Wen et al. |
| 2010/0005105 A1 | 1/2010 | Zhang et al. |
| 2010/0165112 A1 | 7/2010 | Scanlon et al. |
| 2010/0166339 A1 | 7/2010 | Gokturk et al. |
| 2011/0047046 A1 | 2/2011 | Torres |
| 2011/0158519 A1 | 6/2011 | Zhao |
| 2011/0162002 A1 | 6/2011 | Jones et al. |
| 2011/0179021 A1 | 7/2011 | Wen et al. |
| 2011/0200251 A1 | 8/2011 | Chin et al. |
| 2011/0235902 A1 | 9/2011 | Chittar et al. |
| 2011/0314031 A1 | 12/2011 | Chittar et al. |
| 2012/0020581 A1 | 1/2012 | Zarom |
| 2012/0109858 A1 | 5/2012 | Makadia et al. |
| 2012/0294520 A1 | 11/2012 | Mei et al. |
| 2012/0310769 A1 | 12/2012 | Lawrence et al. |
| 2013/0044944 A1 | 2/2013 | Wang et al. |
| 2013/0083999 A1 | 4/2013 | Bhardwaj et al. |
| 2013/0084000 A1 | 4/2013 | Bhardwaj et al. |
| 2013/0084001 A1 | 4/2013 | Bhardwaj et al. |
| 2013/0084002 A1 | 4/2013 | Bhardwaj et al. |
| 2013/0085893 A1 | 4/2013 | Bhardwaj et al. |
| 2014/0201027 A1 | 7/2014 | Bhardwaj et al. |
| 2014/0201028 A1 | 7/2014 | Bhardwaj et al. |
| 2014/0254927 A1 | 9/2014 | Bhardwaj et al. |
| 2014/0310304 A1 | 10/2014 | Bhardwaj et al. |
| 2015/0055860 A1 | 2/2015 | Bhardwaj et al. |
| 2015/0170250 A1 | 6/2015 | Dalal et al. |
| 2016/0063603 A1 | 3/2016 | Bhardwaj et al. |
| 2016/0117572 A1 | 4/2016 | Bhardwaj et al. |
| 2016/0189011 A1 | 6/2016 | Bhardwaj et al. |
| 2019/0114515 A1 | 4/2019 | Bhardwaj et al. |

FOREIGN PATENT DOCUMENTS

| | | | |
|---|---|---|---|
| KR | 1020070068408 | A | 6/2007 |
| KR | 10-2008-0032890 | A | 4/2008 |
| KR | 1020100034105 | A | 4/2010 |
| KR | 1020100126468 | A | 12/2010 |
| KR | 10-1836056 | B1 | 2/2018 |
| WO | 2006/047769 | A1 | 5/2006 |
| WO | 2009/111498 | A2 | 9/2009 |
| WO | 2009/111498 | A3 | 12/2009 |
| WO | WO-2013049736 | A1 | 4/2013 |
| WO | 2014/169260 | A1 | 10/2014 |

OTHER PUBLICATIONS

Notice of Preliminary Rejection received for Korean Patent Application No. 10-20187-005651, dated May 7, 2018, 15 pages (6 pages of English Translation and 9 pages of Official Copy).
Communication pursuant to Article 94(3) EPC received for European Patent Application No. 12835362.0, dated Oct. 4, 2017, 9 pages.
Response to Communication pursuant to Articles 94(3) EPC filed on Feb. 1, 2018 for European Patent Application No. 12835362.0, dated Oct. 4, 2017, 17 pages.
Non-Final Office Action received for U.S. Appl. No. 14/936,052, dated Feb. 8, 2018, 13 pages.
Response to Non-Final Office Action filed on May 30, 2018 for U.S. Appl. No. 14/936,052, dated Feb. 8, 2018, 16 pages.
Response to Office Action filed on Oct. 4, 2017 for Canadian Patent Application No. 2,850,020, dated Apr. 18, 2017, 13 pages.
Office Action received for Canadian Patent Application No. 2,960,234, dated Aug. 21, 2017, 4 pages.
Response to Office Action filed on Feb. 9, 2018 for Canadian Patent Application No. 2,960,234, dated Aug. 21, 2017, 13 pages.
Arthur et al., "k-means++: The Advantages of Careful Seeding", Proceedings of the Eighteenth Annual ACM-SIAM Symposium on Discrete Algorithms, Jan. 7-9, 2007, pp. 1027-1035.
Bradski, "Computer Vision Face Tracking for Use in a Perceptual User Interface", Retrieved from the Internet: <URL: http://opencv.jp/opencv-1.0.0_org/docs/papers/camshift.pdf>, 1998, pp. 1-15.

(56) References Cited

OTHER PUBLICATIONS

Canny, "A Computational Approach to Edge Detection", IEEE Transactions on Pattern Analysis and Machine Intelligence, vol. No. 8, Issue No. 6, Nov. 1986, pp. 679-698.
Dalal et al., "Histograms of Oriented Gradients for Human Detection", Retrieved from the Internet: <URL:https://hal.inria.fr/inria-00548512/document>, 2005, pp. 886-893.
Dollar et al., "Pedestrian Detection: A Benchmark", IEEE Conference on Computer Vision and Pattern Recognition, Jun. 2009, pp. 304-311.
Huang, "High-Performance Rotation Invariant Multiview Face Detection", IEEE Transactions on Pattern Analysis and Machine Intelligence, vol. 29 No. 4, Apr. 2007, pp. 671-686.
Jahne et al., "Principles of Filter Design-Chapter 6, Handbook of Computer Vision and Applications", vol. 2, Signal Processing and Pattern Recognition, 1999, pp. 125-152.
Viola et al., "Rapid Object Detection using a Boosted Cascade of Simple Features", IEEE Conference on Computer Vision and Pattern Recognition, 2001, pp. 511-518.
Yilmaz et al., "Object Tracking: A Survey", ACM Computing Surveys, vol. 38, No. 4, Article 13, Dec. 2006, 45 pages.
Korean Application Serial No. 10-2018-7005651, Response filed Jul. 6, 2018 to Notice of Preliminary Rejection dated May 7, 2018, 33 pages ( with English Translation).
"Korean Application Serial No. 10-2017-7005585, Response filed Jul. 25, 2017 to Office Action dated May 25, 2017", W / English Claims, 21 pgs.
Office Action received for Korean Patent Application No. 10-2019-7006241, dated May 17, 2019, 11 pages(6 pages of Official Copy and 5 pages of English Translation).
Summons to Attend Oral Proceedings Received for European Patent Application No. 12835362.0, dated Jun. 3, 2019, 9 pages.
"U.S. Appl. No. 14/936,052, Notice of Allowance dated Sep. 4, 2018", 7 pgs.
"U.S. Appl. No. 13/631,833, Notice of Allowance dated Mar. 20, 2014", 5 pgs.
"U.S. Appl. No. 13/631,833, Notice of Allowance dated Nov. 8, 2013", 9 pgs.
"U.S. Appl. No. 13/631,839, Corrected Notice of a Allowability dated Mar. 31, 2014", 4 pgs.
"U.S. Appl. No. 13/631,839, Notice of Allowance dated Dec. 23, 2013", 8 pgs.
"U.S. Appl. No. 13/631,839, PTO Response to 312 Communication dated Apr. 3, 2014", 2 pgs.
"U.S. Appl. No. 13/631,842, Notice of Allowance dated Aug. 4, 2014", 7 pgs.
"U.S. Appl. No. 13/631,842, PTO Response to Rule 312 Communication dated Nov. 13, 2014", 2 pgs.
"U.S. Appl. No. 13/631,848, Final Office Action dated Jul. 15, 2016", 31 pgs.
"U.S. Appl. No. 13/631,848, Final Office Action dated Aug. 19, 2015", 20 pgs.
"U.S. Appl. No. 13/631,848, Non Final Office Action dated Apr. 30, 2015", 23 pgs.
"U.S. Appl. No. 13/631,848, Non Final Office Action dated Nov. 4, 2014", 19 pgs.
"U.S. Appl. No. 13/631,848, Non Final Office Action dated Dec. 3, 2015", 25 pgs.
"U.S. Appl. No. 13/631,848, Respnse filed Nov. 18, 2015 to Final Office Action dated Aug. 19, 2015", 16 pgs.
"U.S. Appl. No. 13/631 848, Response filed Jan. 30, 2015 to Non Final Office Action dated Nov. 4, 2014", 19 pgs.
"U.S. Appl. No. 13/631,848, Response filed Mar. 1, 2016 to Non Final Office Action dated Dec. 3, 2015", 18 pgs.
"U.S. Appl. No. 13/631,848, Response filed Jul. 30, 2015 to Non Final Office Action dated Apr. 30, 2015", 17 pgs.
"U.S. Appl. No. 13/631,849, Notice of Allowance dated Dec. 26, 2013", 8 pgs.
"U.S. Appl. No. 14/218,704, Communication Regarding Corrected Application Papers filed Oct. 15, 2015", 115 pgs.
"U.S. Appl. No. 14/218,704, Notice of Allowance dated Aug. 6, 2015", 7 pgs.
"U.S. Appl. No. 14/218,704, Preliminary Amendment filed Apr. 14, 2014", 8 pgs.
"U.S. Appl. No. 14/218,704, PTO Response to 312 Amendment dated Oct. 23, 2015", 2 pgs.
"U.S. Appl. No. 14/218,772, Notice of Allowance dated Oct. 1, 2015", 9 pgs.
"U.S. Appl. No. 14/218,772, Notice of Allowance dated Dec. 4, 2015", 8 pgs.
"U.S. Appl. No. 14/218,772, Preliminary Amendment filed Apr. 11, 2014", 8 pgs.
"U.S. Appl. No. 14/218,772, PTO Response to Rule 312 Communication dated Oct. 28, 2015", 2 pgs.
"U.S. Appl. No. 14/286,594, Non Final Office Action dated May 8, 2015", 5 pgs.
"U.S. Appl. No. 14/286,594, Notice of Allowance dated Sep. 1, 2015", 8 pgs.
"U.S. Appl. No. 14/286,594, Preliminary Amendment filed Jun. 3, 2014", 8 pgs.
"U.S. Appl. No. 14/286,594, Response filed Aug. 10, 2015 to Non Final Office Action dated May 8, 2015", 8 pgs.
"U.S. Appl. No. 14/521,318, Non Final Office Action dated Dec. 21, 2015", 5 pgs.
"U.S. Appl. No. 14/521,318, Notice of Allowance dated Nov. 18, 2016", 7 pgs.
"U.S. Appl. No. 14/521,318, Preliminary Amendment filed Oct. 30, 2014", 8 pgs.
"U.S. Appl. No. 14/521,318, Response filed Mar. 21, 2016 to Non Final Office Action dated Dec. 21, 2015", 10 pgs.
"U.S. Appl. No. 14/521,318, Response filed Aug. 10, 2016 to Notice of Non-compliant Amendment", 4 pgs.
"U.S. Appl. No. 14/936,052, First Action Interview—Pre-Interview Communication dated Apr. 7, 2017", 11 pgs.
"U.S. Appl. No. 14/936,052, Notice of Allowance dated Jul. 25, 2017", 7 pgs.
"U.S. Appl. No. 14/936,052, Response filed May 8, 2017 to First Action Interview Pre-Interview Communication dated Apr. 7, 2017", 1 pg.
"U.S. Appl. No. 14/988,994, First Action Interview—Office Action Summary dated Dec. 23, 2016", 5 pgs.
"U.S. Appl. No. 14/988,994, First Action Interview—Pre-Interview Communication dated Sep. 26, 2016", 3 pgs.
"U.S. Appl. No. 14/988,994, Notice of Allowance dated Jun. 13, 2017", 7 pgs.
"U.S. Appl. No. 14/988,994, Preliminary Amendment filed Jan. 11, 2016", 7 pgs.
"U.S. Appl. No. 14/988,994, Response filed Apr. 24, 2017 to First Action Interview—Office Action Summary dated Dec. 23, 2016", 8 pgs.
"U.S. Appl. No. 14/988,994, Response filed Oct. 26, 2016 to Pre-Interview Communication dated Sep. 26, 2016", 1 pg.
"U.S. Appl. No. 15/065,122, Notice of Allowance dated Mar. 27, 2017", 8 pgs.
"U.S. Appl. No. 15/065,122, Preliminary Amendment filed Apr. 22, 2016", 7 pgs.
"Australian Application Serial No. 2012315625, Amendment filed Apr. 8, 2014", 6 pgs.
"Australian Application Serial No. 2012315625, Office Action dated Mar. 20, 2015", 3 pgs.
"Australian Application Serial No. 2012315625, Response filed Aug. 14, 2015 to Office Action dated Mar. 20, 2015", 7 pgs.
"Australian Application Serial No. 2015271906, First Examiners Report dated Nov. 2, 2016", 2 pgs.
"Australian Application Serial No. 2015271906, Response filed Jan. 13, 2017 to First Examiners Report dated Nov. 2, 2016", 4 pgs.
"Canadian Application Serial No. 2,850,020, Office Action dated Apr. 13, 2017", 3 pgs.
"Canadian Application Serial No. 2,850,020, Office Action dated Apr. 18, 2017", 3 pgs.
"Canadian Application Serial No. 2,850,020, Office Action dated Sep. 12, 2016", 3 pgs.

(56) References Cited

OTHER PUBLICATIONS

"Canadian Application Serial No. 2,850,020, Response filed Mar. 8, 2017 to Office Action dated Sep. 12, 2016", 10 pgs.
"Canadian Application Serial No. 2,850,020, Voluntary Amendment filed Jul. 13, 2015", 7 pgs.
"Collaborative Filtering—from Wikipedia, the free enclyclopedia", [Online]. Retrieved from the Internet: <URL: http://en.wikipedia.org/wiki/Collaborative_filtering>, (Accessed Mar. 7, 2013), 8 pgs.
"European Application Serial No. 12835362.0, Communication pursuant to Article 94(3) dated Nov. 4, 2015", 7 pgs.
"European Application Serial No. 12835362.0, Extended European Search Report dated Feb. 12, 2015", 6 pgs.
"European Application Serial No. 12835362.0, Office Action dated May 9, 2014", 3 pgs.
"European Application Serial No. 12835362.0, Response filed Jun. 19, 2015", 13 pgs.
"European Application Serial No. 12835362.0, Response filed Jun. 26, 2014", 7 pgs.
"European Application Serial No. 12835362.0, Response filed Mar. 11, 2016 to Communication pursuant to Article 94(3) dated Nov. 4, 2015", 13 pgs.
"International Application Serial No. PCT/US2012/058142, International Preliminary Report on Patentability dated Apr. 10, 2014", 16 pgs.
"International Application Serial No. PCT/US2012/058142, International Search Report dated Feb. 5, 2013", 4 pgs.
"International Application Serial No. PCT/US2012/058142, Invitation to Pay Additional Fees and Partial Search Report dated Nov. 20, 2012", 2 pgs.
"International Application Serial No. PCT/US2012/058142, Written Opinion dated Feb. 5, 2013", 14 pgs.
"Korean Application Serial No. 10-2017-7005585, Office Action dated May 25, 2017" with English translation of claims, 12 pgs.
"Korean Application Serial No. 2014-7011688, Office Action dated May 21, 2015", with English translation of claims, 7 pgs.
"Korean Application Serial No. 2014-7011688, Response filed Jul. 21, 2015", with English translation of claims, 46 pgs.
"Korean Application Serial No. 2016-7005362, Reasons for Rejection dated May 25, 2016", (w/English Translation), 15 pgs.
"Korean Application Serial No. 2016-7005362, Response filed Jul. 22, 2016 to Reasons for Rejection dated May 25, 2016", w/ English Claims, 28 pgs.
Donovan, Peter, et al., "Color Compatibility From Large Datasets", [Online]. Retrieved from the Internet: <URL: http://www.dgp.toronto.edu/~donovan/color/colorcomp>, (Accessed Mar. 7, 2013), 12 pgs.
Li, Congcong, "Aesthetic Visual Quality Assessment of Paintings", [Online]. Retrieved from the Internet: <URL: http://chenlab.ece.cornell.edu/people/congcong/publications/IJSTSP_Aesthetics>, (Accessed Mar. 7, 2013), 17 pgs.

ITEM RECOMMENDATIONS USING IMAGE FEATURE DATA

CROSS-REFERENCE TO RELATED APPLICATIONS

This application is a continuation of U.S. patent application Ser. No. 15/065,122, filed Mar. 9, 2016, which is a continuation of U.S. patent application Ser. No. 14/218,772, filed Mar. 18, 2014, now U.S. Pat. No. 9,311,666, which is a continuation of U.S. patent application Ser. No. 13/631, 839 filed Sep. 28, 2012, now U.S. Pat. No. 8,737,728, which claims priority to U.S. Provisional Patent Application Nos. 61/541,970 filed Sep. 30, 2011; 61/554,890 filed Nov. 2, 2011; and 61/567,050 filed Dec. 5, 2011, the contents of which are incorporated herein by reference in their entirety.

TECHNICAL FIELD

The present invention relates generally to image recognition and uses of image data obtained from image recognition.

BACKGROUND

Images can be used to convey information more efficiently or in a way not possible with text, particularly from the viewpoint of a user viewing the images or to facilitate electronic commerce (e-commerce). However, in order to use images based on the wealth of information contained therein, image processing is performed to extract, identify, or otherwise recognize attributes of the images. Once extracted, the image data can be used in a variety of applications. Depending on the particular application(s), certain types of image processing may be implemented over others. In some instances, the present image processing algorithms may be insufficient.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Some embodiments are illustrated by way of example and not limitations in the figures of the accompanying drawings, in which.

The headings provided herein are for convenience only and do not necessarily affect the scope or meaning of the terms used.

DETAILED DESCRIPTION

Described in detail herein is an apparatus and method for extracting image feature data from an input image and various uses of the image feature data. Image feature data includes, but is not limited to, color histogram, pattern identification, dominant color, and/or orientation histogram corresponding to the input image. The input image comprises a photo taken by the user to capture at least a color and/or pattern, or an image included in a website or web page not affiliated with the e-commerce site or online marketplace. The extracted image feature data is used to provide recommendations of items offered for sale at an e-commerce site or online marketplace that match and/or complement the input image. The confidence level of the image feature data for the input image determines the particular type of image feature data of the inventory items to compare against. In some embodiments, user preference indications during viewing of the (initial) recommendation results facilitates re-ordering the item listing order of the recommendation results to better meet the user's actual interested feature(s) within the input image. In some embodiments, one or more sources are used to obtain current fashion trends and/or color combination data (e.g., purchasing behavior data, expert knowledge data, social network data). The fashion trends and/or color combination data are distilled into one or more complementary rules for use in determining complementary items to the input image.

Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
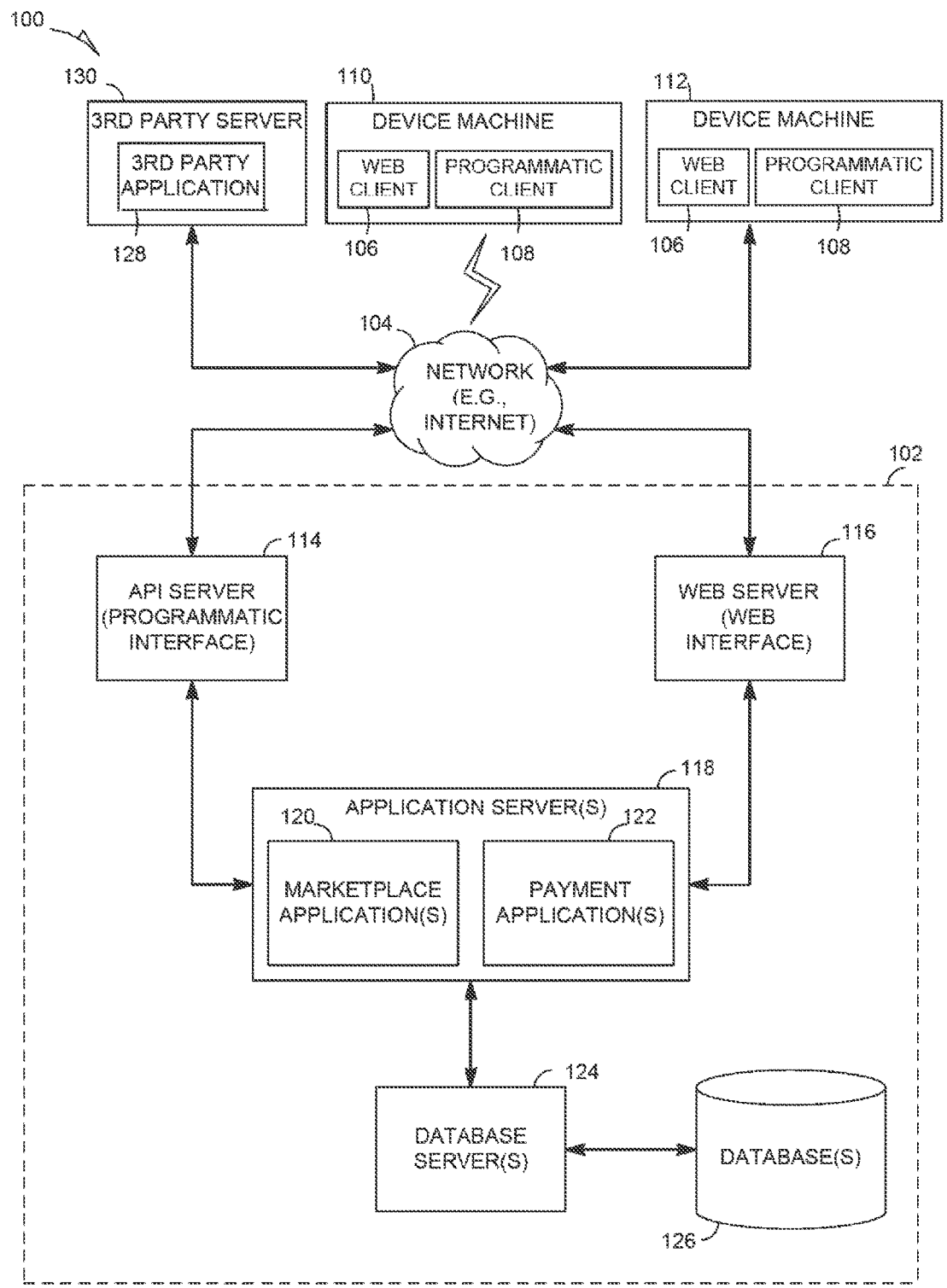
FIG. 1 illustrates a network diagram depicting an example system for performing image processing and using image feature data obtained from image processing according to some embodiments.

FIG. 1 illustrates a network diagram depicting an example system 100 for performing image processing and using image feature data obtained from image processing according to some embodiments. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the publication system 100 comprises a marketplace system. In another embodiment, the publication system 100 comprises other types of systems such as, but not limited to, a social networking system, a matching system, a recommendation system, an electronic commerce (e-commerce) system, and the like.

Each of the device machines 110, 112 comprises a computing device that includes at least a display and communication capabilities with the network 104 to access the networked system 102. The device machines 110, 112 comprise, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the device machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions/services may include a number of publisher functions and services (e.g., search, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the device machines 110 and/or 112.

Further, while the system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
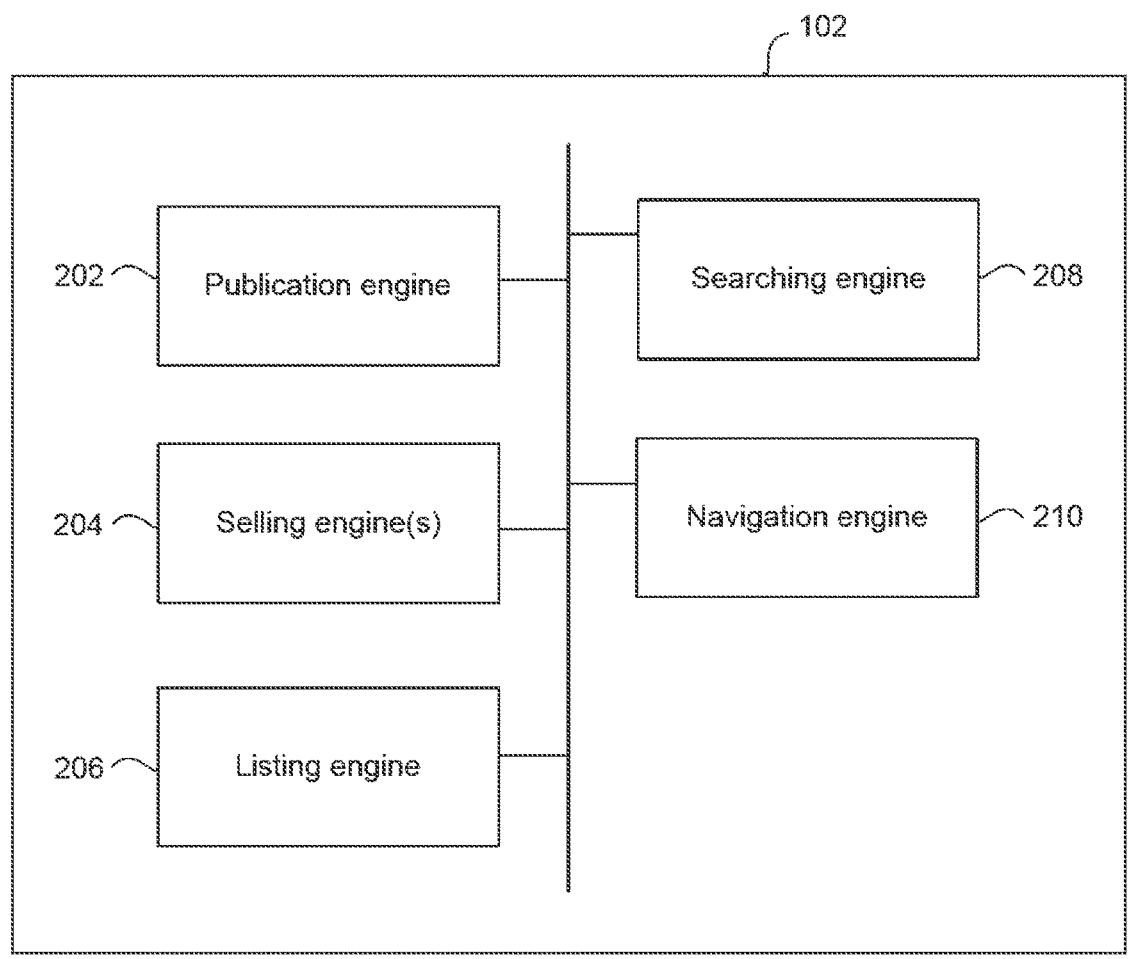
FIG. 2 illustrates a block diagram showing components provided within the system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the data servers 128.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 308 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify as part of the search query a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below.

Figure 3:
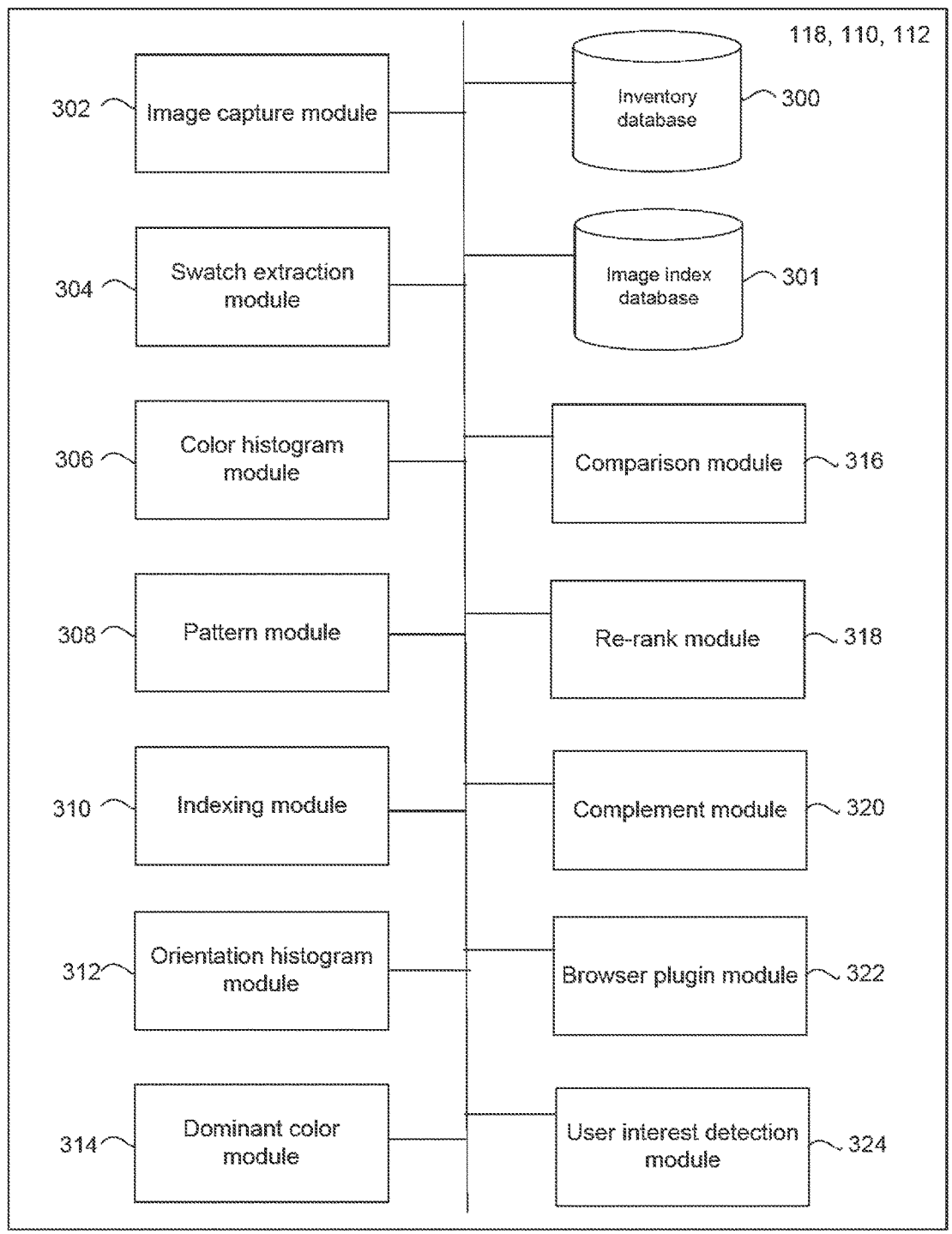
FIG. 3 illustrates a block diagram showing image processing and image data usage functionalities/operations implemented in modules and libraries/data structures/databases according to some embodiments.

FIG. 3 illustrates a block diagram showing image processing and image data usage functionalities/operations implemented in modules and libraries/data structures/databases according to some embodiments. The modules comprise one or more software components, programs, applications, apps, or other units of code base or instructions configured to be executed by one or more processors included in the application servers 118, device machine 110, and/or device machine 112. The modules include an image capture module 302, a swatch extraction module 304, a color histogram module 306, a pattern module 308, an indexing module 310, an orientation histogram module 312, a dominant color module 314, a comparison module 316, a re-rank module 318, a complement module 320, a browser plugin module 322, and a user interest detection module 324. The modules 302-324 can communicate with each of an inventory database 300 and image index database 301, in which databases 300, 301 may be included in the databases 126. Although modules 302-324 are shown as distinct modules in FIG. 3, it should be understood that modules 302-324 may be implemented as fewer or more modules than illustrated. It should also be understood that any of modules 302-324 may communicates with one or more components included in the system 100, such as database servers 124, application servers 118, third party server 130, device machine 110, or device machine 112. Similarly, databases 300, 301 are shown as distinct databases in FIG. 3. However, it is understood that the content of databases 300, 301 may be stored in fewer or more databases than illustrated.

In some embodiments, one or more of modules 302-324 are downloaded from an e-commerce site appropriate for the type of computing device. For example, if the device machine 110 (or device machine 112) comprises an iOS-type device (e.g., iPhone or the iPad), then the modules (which can be packaged as part of an e-commerce site app) can be downloaded from iTunes. Similarly, if the device machine 110 (or device machine 112) comprises an Android-type device, then the modules can be downloaded from the Android Marketplace. The device machine 110 and/or device machine 112 has communication capabilities with servers or databases at a remote location (e.g., databases 126, database servers 124, API server 114, web server 116) to access data and/or processing capabilities to facilitate image capture, image processing, and use of image data from image processing as described in detail below.

In other embodiments, one or more of modules 302-324 may be hosted on the application servers 118 and no download of the modules is required on the device machines 110, 112. Instead, the modules may be accessed by device machines 110, 112 using a web browser over the network 104. In still other embodiments, some of the modules may be included in the device machines 110, 112 while other of the modules may be included in the application servers 118; the device machines 110, 112 communicating with the application servers 118 to together provide the appropriate functionalities.

Figure 4:
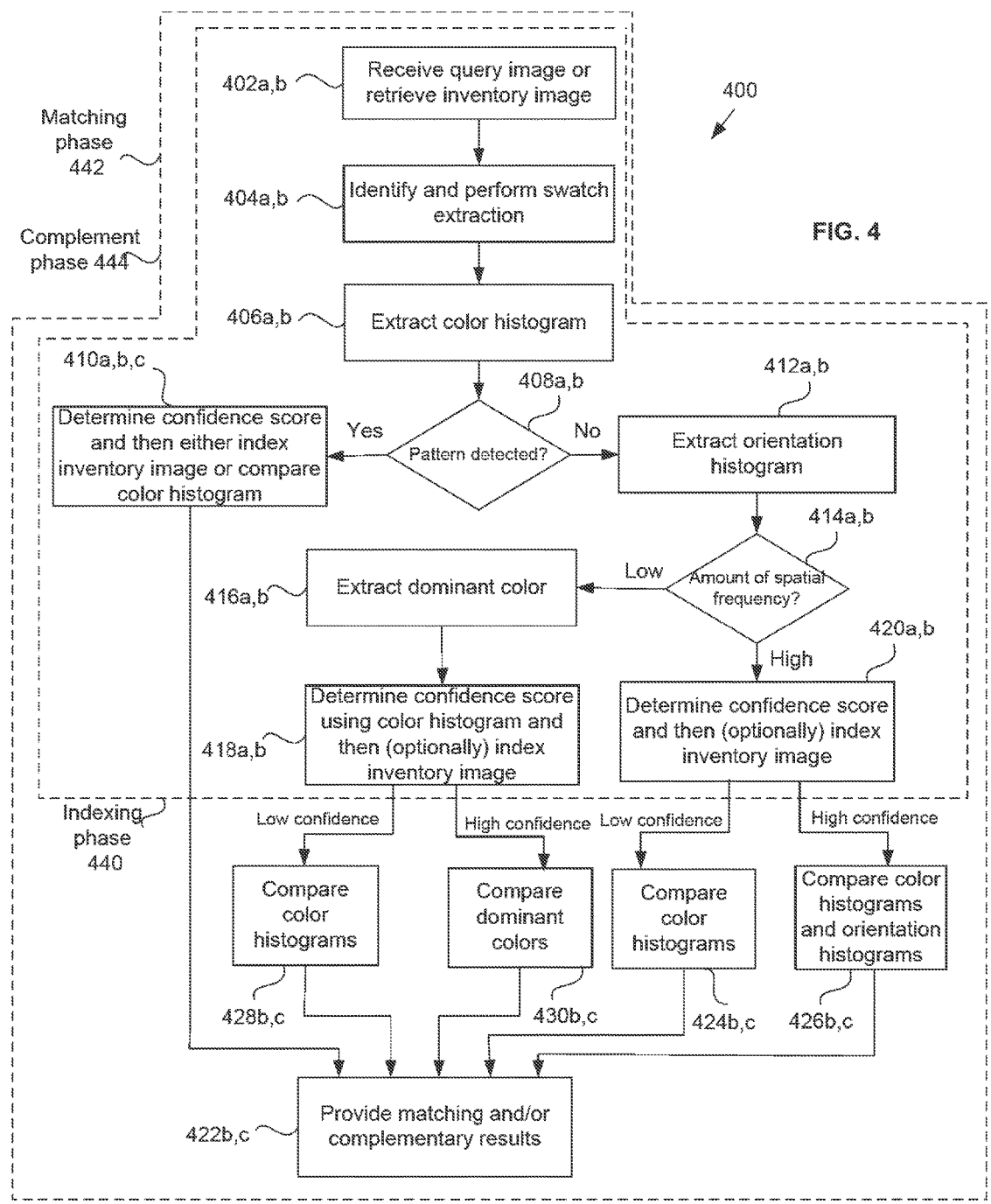
FIG. 4 illustrates an example flow diagram for image processing and determination of image matches implemented by the modules of FIG. 3 according to some embodiments.

FIG. 4 illustrates an example flow diagram 400 for image processing and determination of image matches implemented by the modules of FIG. 3 according to some embodiments. The operations of the flow diagram 400 may be performed by the device machine 110, device machine 112, and/or a server included in the networked system 102 (e.g., API server 114, web server 116, or application servers 118). Operations/functionalities of flow diagram 400 can be classified into two phases: an indexing phase 440 and a matching phase 442. The indexing phase 440 comprises offline image processing of inventory images (e.g., images corresponding to items offered for sale stored in the inventory database 300) by, for example, application servers 118 in order to obtain image feature data. The obtained image feature data can be indexed into the image index database 301 and subsequently used for faster look-up during the matching phase. In some embodiments the inventory images can be processed in one or more batches. All images of certain categories of inventory items (e.g., clothing, textiles, bedding, shoes, bags, etc.) are indexed based on their features/attributes such as, but not limited to, color distribution, dominant color, orientation histogram, pattern, item category, and the like. Once the indexing phase 440 is complete, the matching phase 442 can be triggered by receipt of a query comprising an image (referred to as a query image). The image index database 301 is accessed to find the closest matching inventory image(s). These inventory image(s) are presented as matching results to the query image. Blocks 402a-420a relates to the indexing phase 440, and blocks 402b-430b relates to the matching phase 442. The indexing phase 440 operations are first described below followed by the matching phase 442 operations.

For the indexing phase 440, at a block 402a, the networked system 102 (e.g., application servers 118) retrieves an inventory image from the inventory database 300. The inventory database 300 contains information about each item offered for sale (or listed) by the e-commerce or marketplace system 100. Information about each item offered for sale includes, but is not limited to, one or more item images, item description, price, brand and model name, seller information, and the like. The inventory image corresponds to an item from any of, but not limited to, the following item categories: clothing, textiles, bedding, shoes, bags, upholstery, electronics, home and garden, or collectibles. Although operations taken on a single inventory image is discussed herein, it is understood that a plurality of inventory images can be processed simultaneously with each other in batch jobs. Operations taken on a given single inventory image is for ease of discussion only.

At a block 404*a*, the swatch extraction module 304 is configured to identify and perform swatch extraction on the retrieved inventory image. It is not uncommon for inventory images to have poor lighting, low contrast, and/or cluttered background. Such less than ideal photographs of inventory items make it difficult to capture feature information. In order to compensate for such shortcomings, the central part of the inventory image is used to perform feature extraction. The central part of the inventory image is more likely to contain the inventory item than other parts of the inventory image. The background is also automatically removed. A sampling mask (e.g., a rectangular region) located at the central part of the inventory image is used to identify a swatch or portion of the inventory image to use for subsequent feature extraction operations. The sampling mask provides the spatial sampling of the inventory image.

Figure 5A:
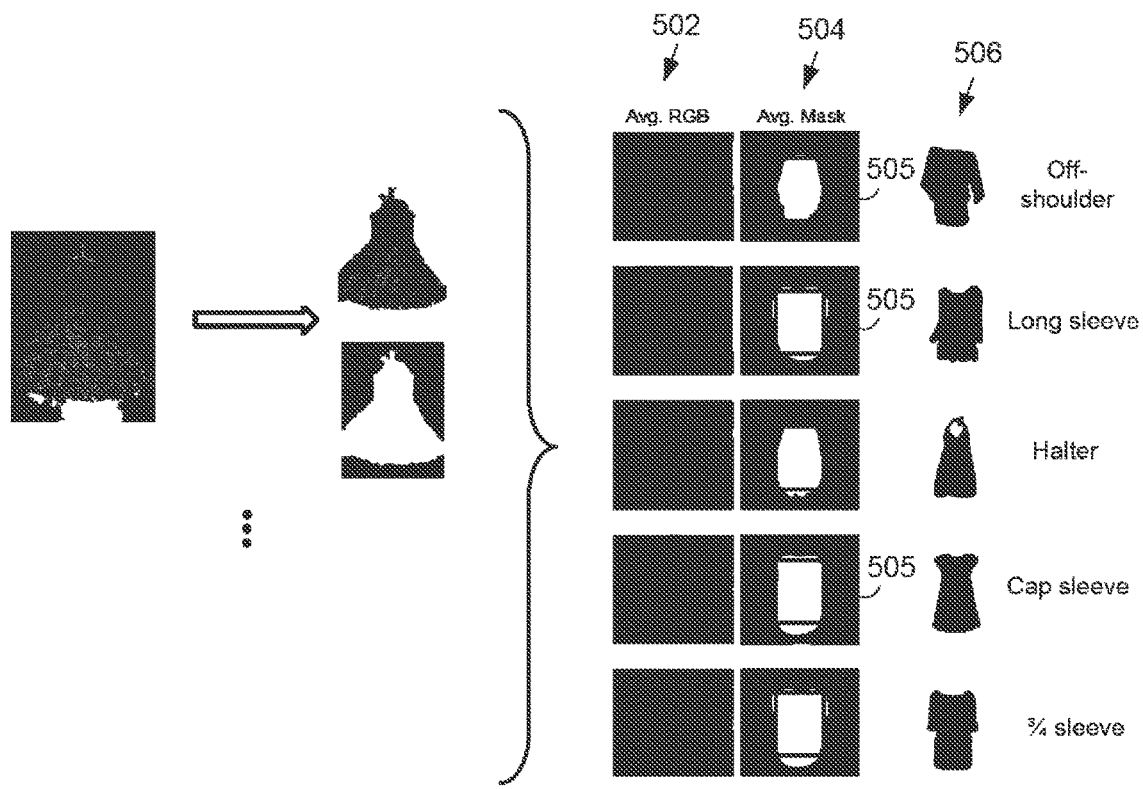
FIG. 5A illustrates sample mean of red green blue (RGB) images as well as that of sample means of masks after background removal for each of a plurality of dress images.
Figure 5B:
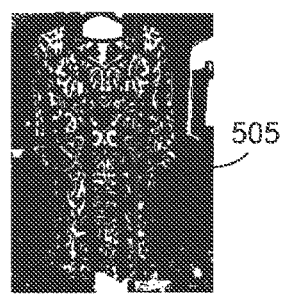
FIGS. 5B-5C illustrate clothing images and corresponding sampling masks according to some embodiments.
Figure 5C:

For example, inventory images of clothing can be accurately sampled from within the sampling mask area. FIG. 5A illustrates sample mean of red green blue (RGB) images 502 as well as that of sample means of masks 505 after background removal 504 for each of a plurality of dress images. The sample mean of masks 505 is an estimate of the spatial prior for each dress style 506 (dress styles based length of the sleeves—none, short, long, etc.). Thus, the change of sampling from the clothing is high if the sample is taken from the central region of the image. The center-sampling strategy works well even in the presence of a complex cluttered background. FIG. 5B illustrates a clothing image that is spatially sampled appropriately (with sampling mask 505 located in the central portion of the image) even though the image has a cluttered background. FIG. 5C illustrates a clothing image containing multiple object instances (e.g., multiple views of the article of clothing within a single image). When the background is simple, it can be removed and the swatch can still be sampled from within the sampling mask 505 region.

Once the sampling area of the inventory image has been determined and extracted—the area within the sampling mask—such sampling area is used for various image feature extraction and identification. At a block 506*a*, the color histogram module 306 is configured to extract the color histogram of the inventory image (using the information contained in the sampling mask area). Extraction of color histogram comprises the extraction or identification of the color distribution of the item featured in the inventory image.

Figure 5D:
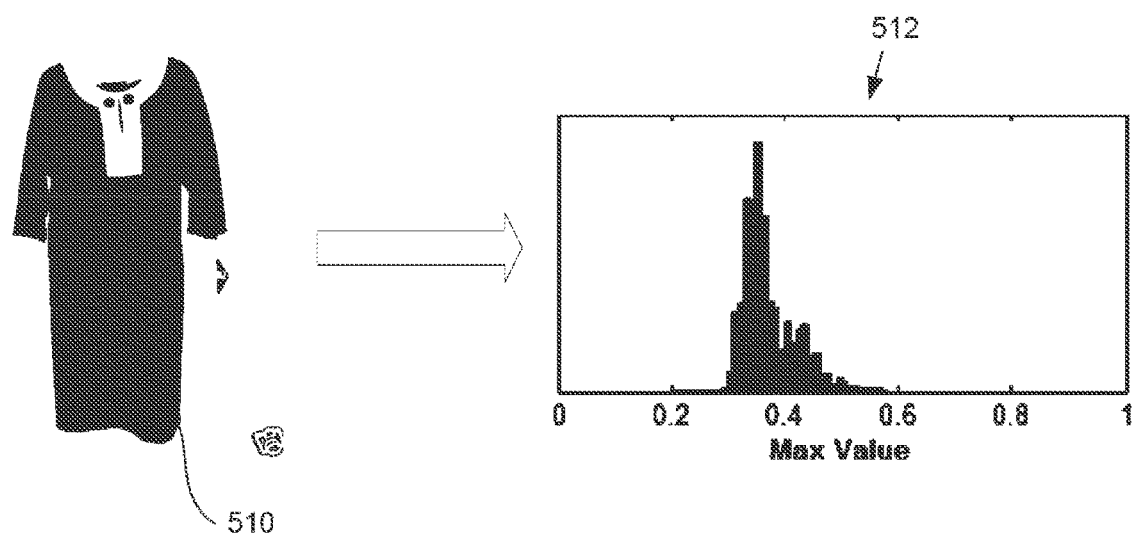
FIG. 5D illustrates an example color histogram for a given clothing item image according to some embodiments.

The choice of color representation is relevant for extraction of color distribution. Color can be represented in various ways. A common color space is the RGB color space, where all colors are represented with respect to three color channels red, green, and blue in 3-dimensions. With RGB color space, however, illumination or lighting variations in an image can affect the three color channels even though a color may be perceived by a user as a single/same color. More than one shade of the color may appear to exist due to lighting variations such as shadows or attenuation of strength of illumination over space. FIG. 5D illustrates a sampling mask 510 over a clothing item image. The color histogram or distribution corresponding to the content of the sampling mask 510 in RGB color space is shown in plot 512. Because the actual color within the sampling mask 510 is a single color (the clothing item is not multi-colored), plot 512 should show a single peak at a single maximum value. Instead, plot 512 shows a number of peaks over a wide range of maximum values due to lighting variations interpreted in RGB color space as different shades of a color or different colors.

Figure 5E:
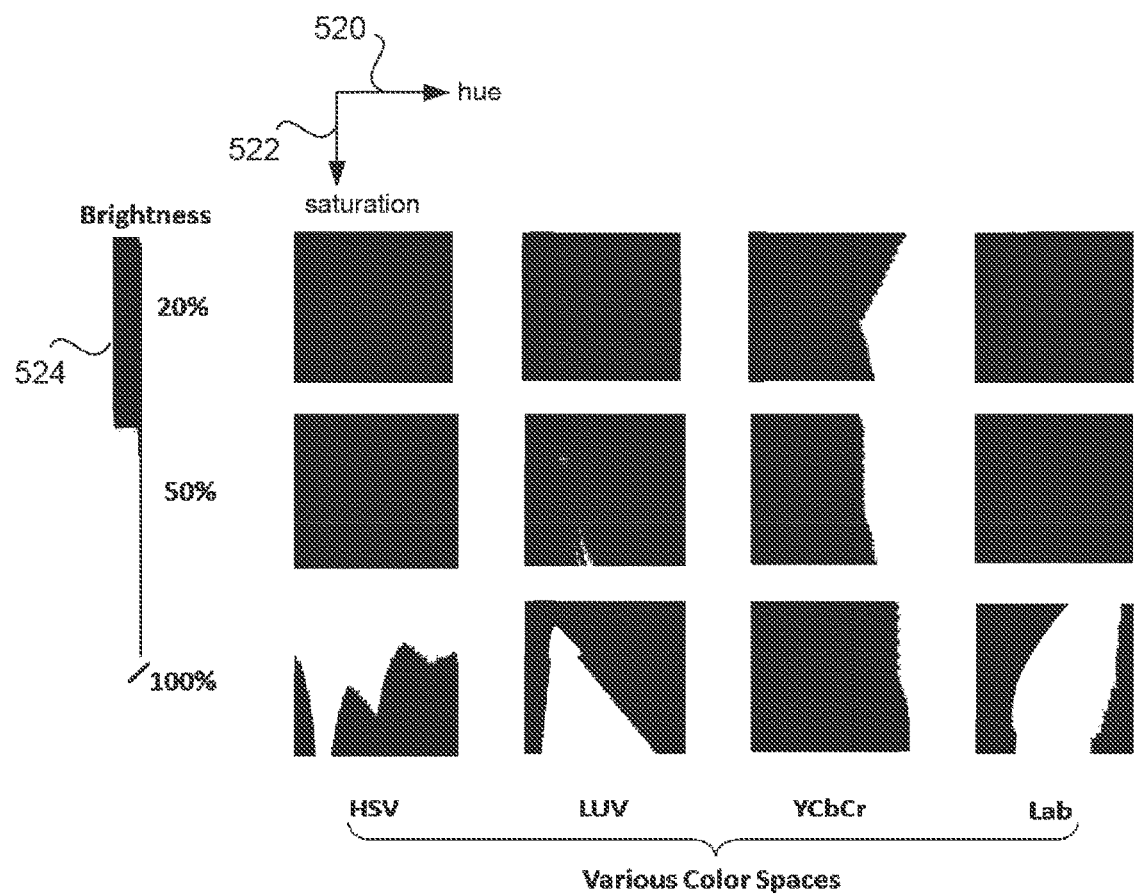
FIGS. 5E-5F illustrate HSV, LUV, $YC_bC_r$, and Lab color spaces according to some embodiments.
Figure 5F:
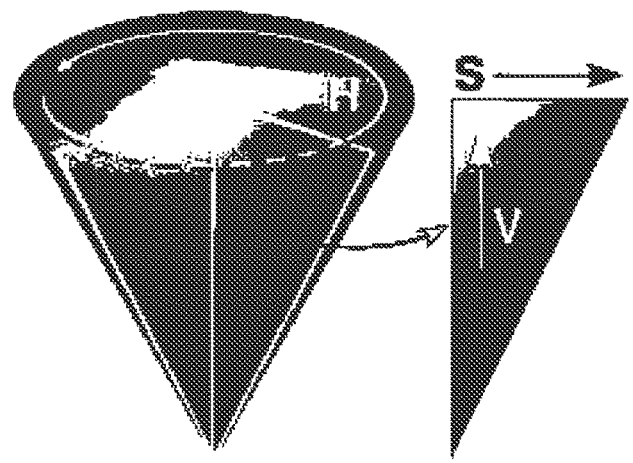

Other color spaces include hue, saturation, and value (HSV); hue, saturation, and lightness/luminance (HSL); hue, saturation, and intensity (HSI); lightness, color-opponent dimension, and color-opponent dimension (Lab); color space adopted by the International Commission on Illumination (LUV); and luminance, blue-difference chroma, and red-difference chroma ($YC_bC_r$). Lab, LUV, and $YC_bC_r$ are examples of non-linear color spaces. Each of these color spaces map RGB values to 2-dimensional chrominance space and a single luminance/brightness channel captures most of the lighting variations. FIG. 5E illustrates the 2-dimensional chrominance spaces for HSV, LUV, $YC_bC_r$, and Lab color spaces in respective columns. Each row shows the respective color spaces at different brightness levels, the brightness level increasing in the direction of the bottom of the page. The chrominance space dims with reduction in brightness of HSV, LUV, and Lab, but not for $YC_bC_r$. FIG. 5F illustrates an alternative view of HSV color space. Saturation is represented by S, the radius (in ∞-norm) of Red, Green, Blue values relative to a value V. Hue represented by H varies angularly. For a given V, the area of annular disc increases as S increases.

In one embodiment, the inventory image (more particularly, within the sampling mask area of the inventory image) is sampled or scanned uniformly (also referred to as uniform sampling) using HSV color space. The pixels from the image are sampled. This is defined by the sampling mask, which defines an estimate of which pixels of the image are of interest. Once these pixels are sampled, information (e.g., image features or attributes) is extracted from each of these pixels. The information can be extracted based on the pixel or the pixel along with its immediate neighbors. Information about color is extracted on a pixel by pixel basis. And then combined, consolidated, or pooled into a collection of values (also referred to as features). In the case of color features, histogram techniques are used—to obtain, for example, a color histogram or an orientation histogram. A histogram comprises a consolidation of occurrences of various values an item, such as a pixel, can take. For example in the case of a color hue, it can have a value between 0 and 1, with an infinite number of possibilities of values possible between 0 and 1. One approach is to quantize values between 0 and 1 to a finite set of possible values—such as 0, 0.1, 0.2, 0.3, 0.4, 0.5, 0.6, 0.7, 0.8, 0.9, and 1. In one embodiment, the hue dimension is quantized into 24 values, saturation dimension is quantized into 8 values, and value dimension is quantized into 8 values. Such quantization may be referred to as the second sampling, the first sampling comprising a sampling of certain pixels of the image and the second sampling comprising a sampling of the value of a pixel quantity. Fewer samples are obtained for luminance/brightness because it is the least reliable of the three dimensions for HSV color space, owing to variations introduced by potential lighting variations.

In FIG. 5E, the three channels of HSV color space are represented by a horizontal axis 520 for hue, a vertical axis 522 for saturation, and a third axis 524 for value or brightness. Hue highly correlates to color frequency, similar to the colors of a rainbow. Saturation represents the purity of a color for a given hue. For example, a low-saturation red is less red than high-saturation red; however, both are still red, only differing in their vividness or colorfulness. Colors tend to be confusing for low-saturation colors in the HSV space. This region can be handled separately.

The mathematical formulas for hue H, saturation S, and value V channels of HSV color space are shown below:

$$V = \max(R, G, B)$$

$$S = \begin{cases} \dfrac{V - \min(R, G, B)}{V}, & \text{iF } V > 0 \\ 0, & \text{OTHERWISE} \end{cases}$$

$$H = \begin{cases} \dfrac{60(G - B)}{S}, & \text{iF } V = R \\ 120 + \dfrac{60(B - R)}{S}, & \text{iF } V = G \\ 240 + \dfrac{60(R - G)}{S}, & \text{iF } V = B \end{cases}$$

where R, G, and B are the RGB values in RGB color space. When H<0, assign H←H+360. Thus, 0≤V≤1, 0≤S≤1 and 0≤H≤360.

Based on the formulas above, it can be seen that for small values of H, all three values R, G, and B are similar. The same is also true for small values of S, since the maximum and minimum values of R, G, and B will be similar. This means that, due to noise, each of R, G, and B values may be dominant spuriously. Thus, hue has discontinuous values (see the conditional assignment for hue in the formulas above). In other words, hue is not reliable when saturation is low. When saturation is low, color will lack vividness and look grayish. This gray region can be handled separately from the colorful region.

Because sampling in full three dimension space as cross-product creates a sparse color histogram, the color histogram module 306 samples the inventory image at least three separate times, once for each of the hue, saturation, and value channel/dimension of the HSV color space. Then the one-dimensional (1D) histograms of hue, saturation, and value are stacked or overlaid over each other. The result is a relatively dense and accurate color histogram of the inventory image in all three dimensions of the HSV color space. Moreover, because the total number of bins in this stacked 1D sampling scheme is much smaller than the full 3D sampling scheme ($n_H + n_S + n_V$ for the 1D sampling scheme vs. $n_H * n_S * n_V$ for the 3D sampling scheme), the memory and processing requirements are significant smaller. This aids in batch indexing a large number of inventory images at the same time.

For example, assume there are five possible values for each space of a 3D color space: {0, 0.25, 0.5, 0.75, 1}. In the case of HSV color space, each of H, S, and V can take values in {0, 0.25, 0.5, 0.75, 1}. The number of possible combinations (which is a cross product) is $5^3 = 125$. Very few such entries occur frequently. Hence, it is sparse, e.g., lots of entries have 0 accumulations of number of occurrence. This can be waste of space (in bytes). Thus, treat each dimension separately, to get a much compact representation. With this technique, only 5+5+5=15 values are required.

Figure 5G:
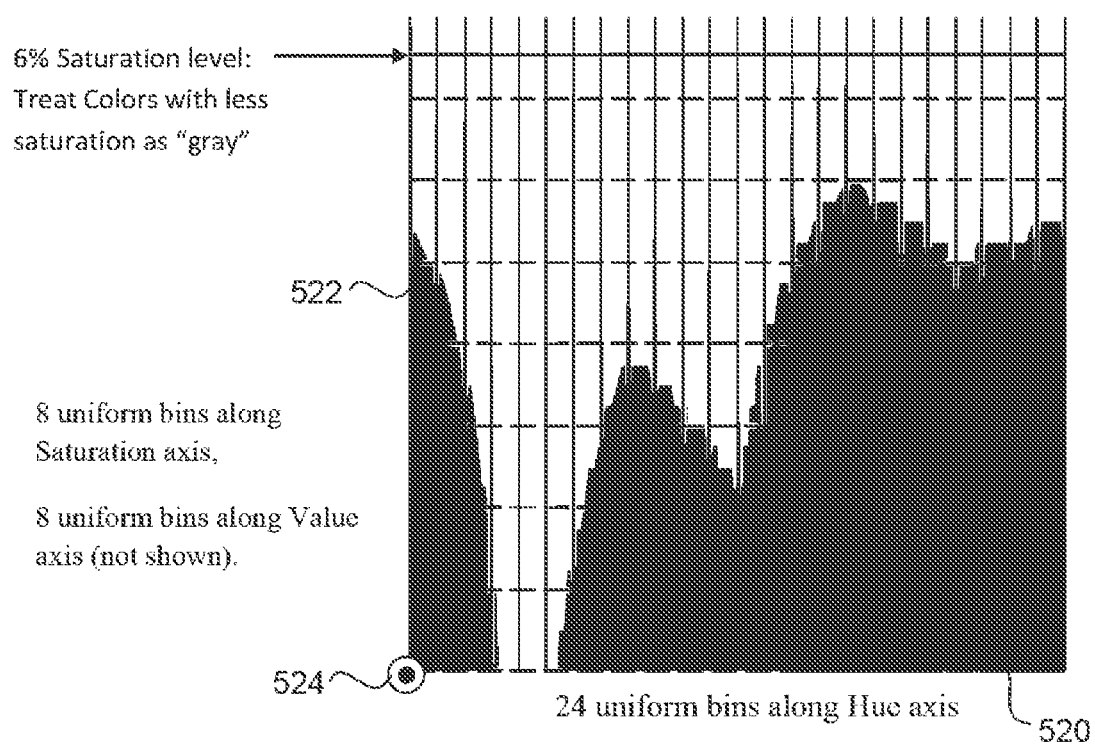
FIG. 5G illustrates use of bins along the axes of HSV color space for image sampling according to some embodiments.
Figure 6:
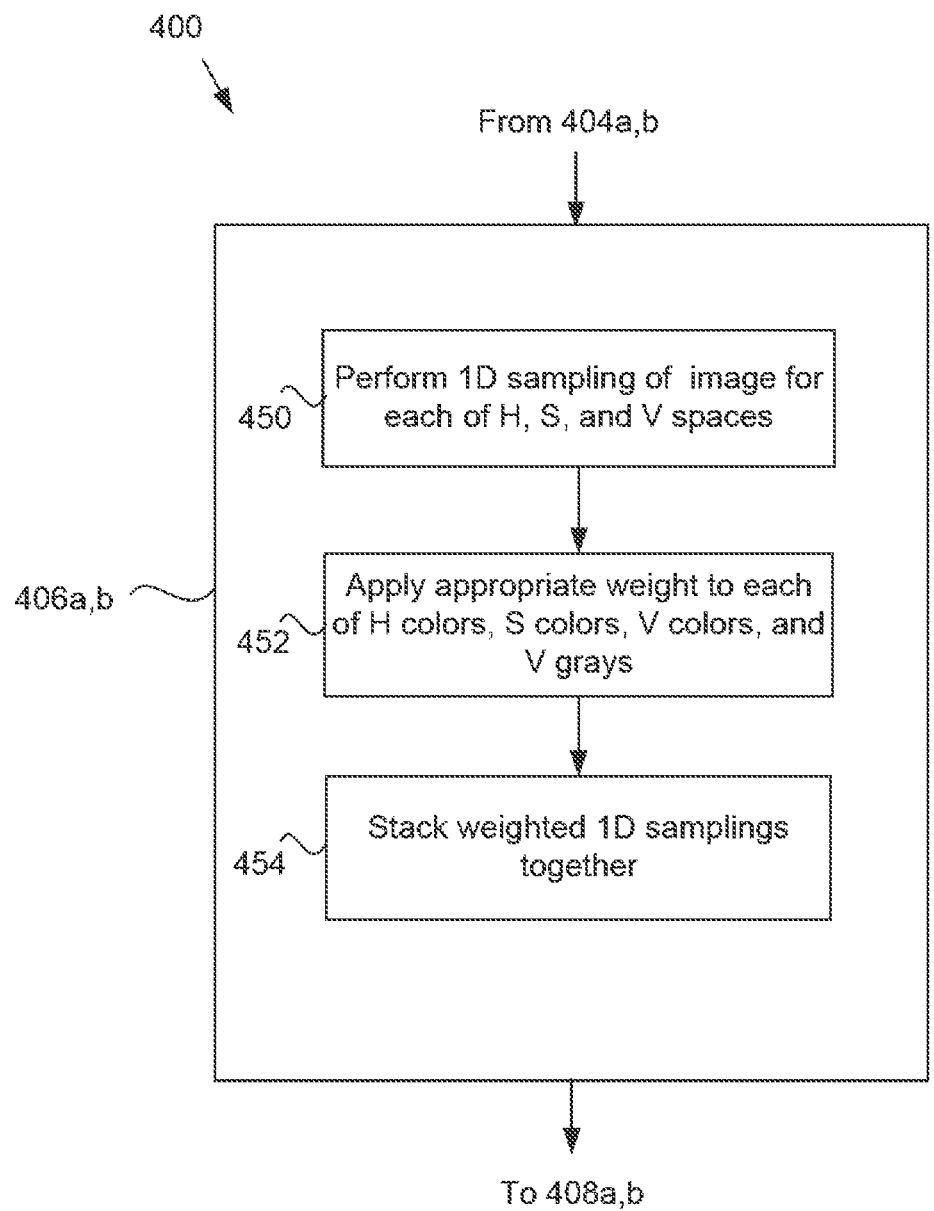
FIGS. 6-8 illustrate additional details of the flow diagram of FIG. 4 according to some embodiments.

FIG. 6 illustrates details of block 406a, b according to some embodiments. In one embodiment, at a sub-block 450, the 1D sampling scheme for HSV space uses uniformly spaced bins along the hue, saturation, and value axes, respectively. As shown in FIG. 5G, the 1D sampling scheme for a given inventory image is implemented using a number of bins along the hue axis of $n_H = 24$, a number of bins along the saturation axis of $n_S = 8$, and a number of bins along the value axis of $n_V = 8$. This is for "colorful" or color pixels, those with saturation of at least 6%. For pixels with saturation less than 6%, they are deemed to be "gray" and are binned separately into 8 bins. Thus, a total of 48 bins=24+8+8+8 are used to extract the provisional color histogram of the inventory image.

Once the bins are accumulated, at a sub-block 452, weights are applied as follows: 0.4 for H values for colorful pixels, 0.2 for S values for colorful pixels, 0.1 for V values for colorful pixels, and 0.3 for V values for gray pixels. Note that the obtained values within each group of bins are not normalized so that the ratio of color pixels to gray pixels is retained and encoded in the stacked histogram.

Figure 5H:
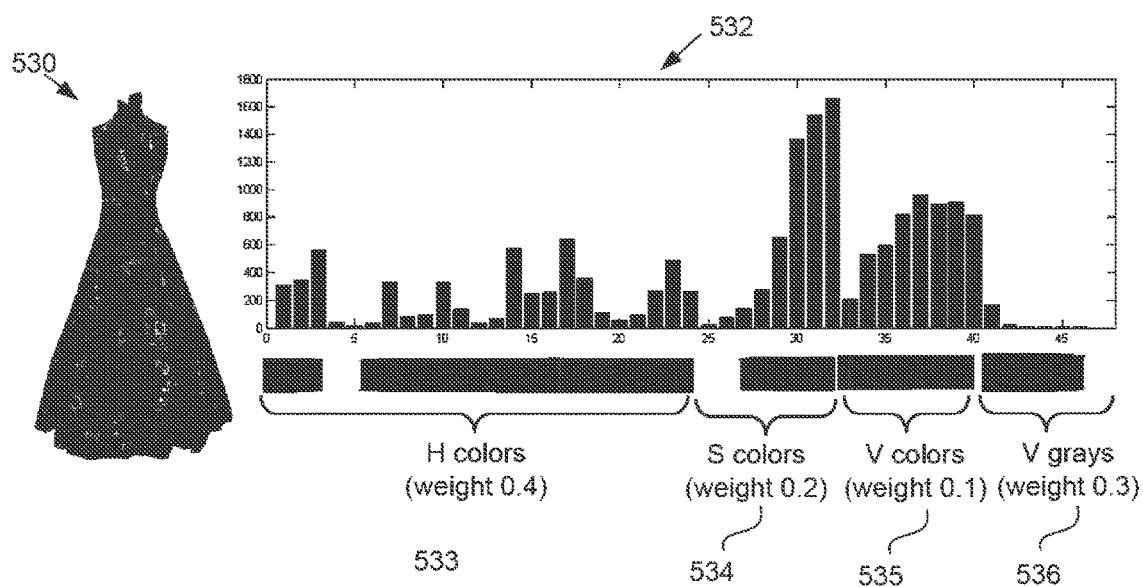
FIG. 5H illustrates an example stacked 1D histogram corresponding to an inventory image of a multi-colored dress according to some embodiments.

Then at a sub-block 454, the 1D samples that have been weight adjusted are stacked or combined together to generate a resulting stacked 1D histogram corresponding to the three dimensions/channels of the HSV color space. FIG. 5H illustrates an example stacked 1D histogram 532 corresponding to an inventory image 530 of a multi-colored dress. The horizontal axis represents the bins (a total of 48 bins) for H, S, and V for color pixels (bin group 533 for H, bin group 534 for S, bin group 535 for V) and also for V for gray pixels (bin group 536). The bins correspond to different colors in the HSV color space. The vertical axis represents the amount of spatial area of a given color relative to other colors sampled on the inventory image 530. Thus, high peaks represent colors that are more prominently present than other colors for the multi-colored dress. As expected, there are no gray colors in the multi-colored dress, and the histogram 532 reflects the absence of gray (e.g., zero or very low amplitudes in bin group 536). The stacked 1D histogram presents information about the image in a relatively compact form, instead of storing values of all pixels of the sampled portion of the image. The vertical axis represents the number of pixels that take the corresponding value on the horizontal axis, with the exception that groups 533, 534, 535, and 536 are scaled/weighted differently by 0.4, 0.2, 0.1 and 0.3, respectively.

Hence, the resulting stacked 1D histogram not only identifies the colors (as well as degree of saturation, brightness, and/or other dimensions of the particular color space that the image is sampled for) present within the sampling mask of the inventory image (which is representative of the entire item being featured in the inventory image) but also the amount of spatial area each of the present colors occupy relative to each other.

In alternative embodiments, the inventory image can be uniformly sampled using a color space other than HSV color space. In still other embodiments, the inventory image can be non-uniformly sampled using LUV color space or other color space appropriate for non-uniform sampling.

Figure 5I:
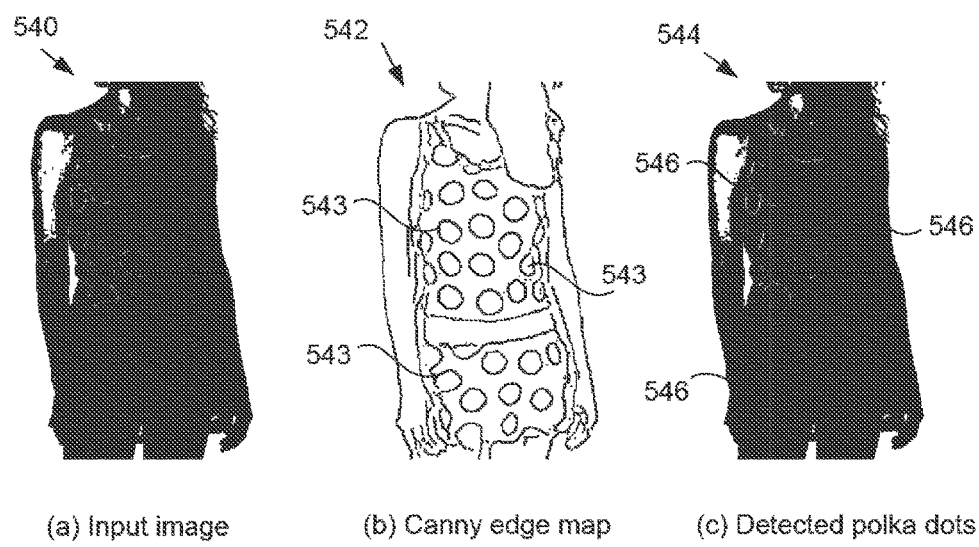
FIG. 5I illustrates processing of an image to detect a pattern according to some embodiments.

Next at a block 408a, the pattern module 308 is configured to detect the presence of and type of pattern in the inventory image. Patterns including, but not limited to, polka dots, stripes, check, plaid, floral, and other repeating patterns can be detected. In one embodiment, an edge map of the inventory image is generated using a Canny edge detector to obtain a Canny edge map corresponding to the inventory image (sub-block 462 of block 408a in FIG. 7). The Canny edge map, in turn, is used to detect a polka dot pattern in the inventory image. FIG. 5I illustrates an image 540 showing a polka dot top. A Canny edge map 542 corresponding to the image 540 comprises a faithful line drawing of the edges included in the image with the colors removed.

Figure 7:
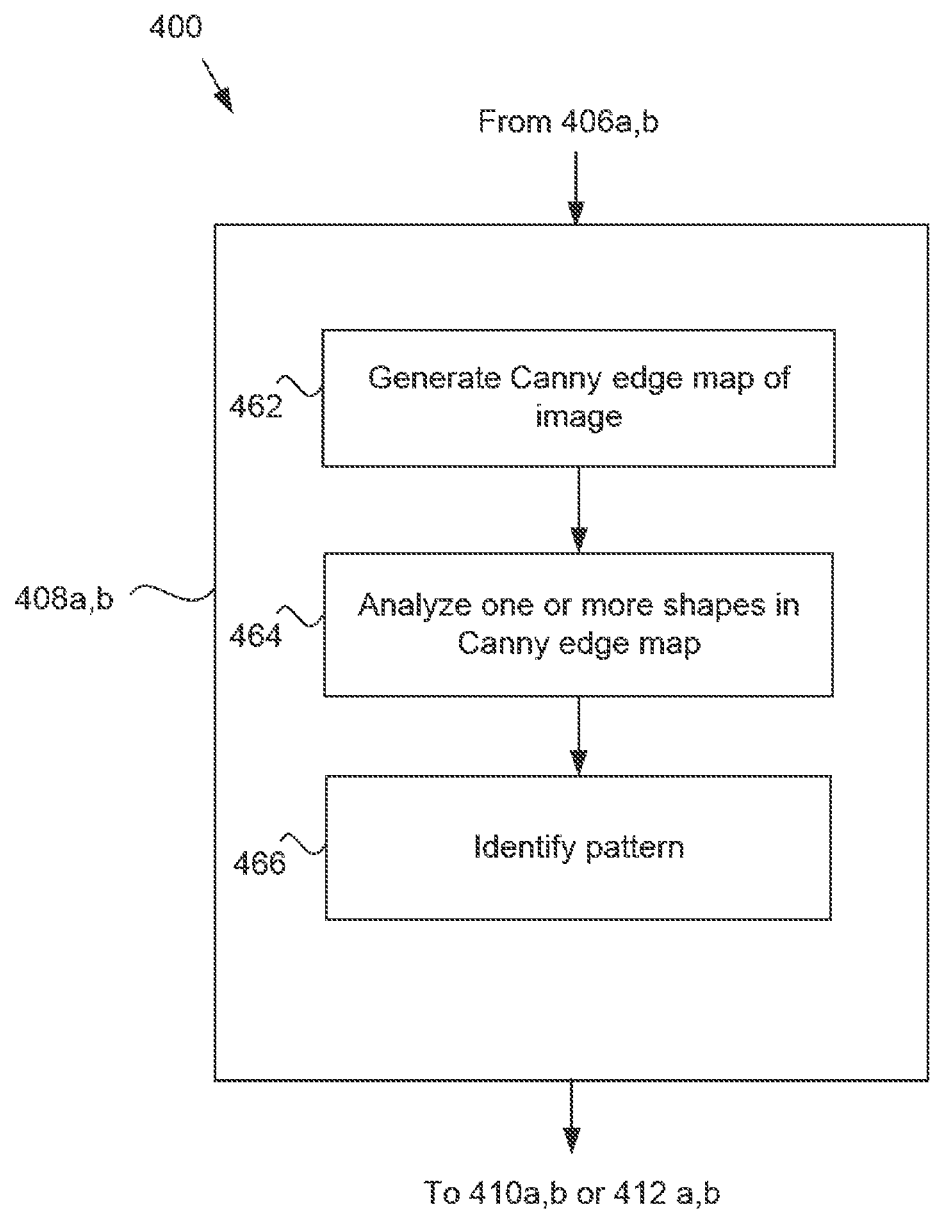

At a sub-block 464 in FIG. 7, the pattern module 308 analyzes the shapes in the Canny edge map 542 to classify them as circles or not circles. In particular, the pattern module 308 studies the properties of blobs 543 in the Canny edge map 542 to determine whether they are circles. Only blobs 543 that are large enough but not too large are retained for analysis. Blobs 543 that are too cluttered are eliminated for analysis. Circularity of each of the blobs 543 retained for analysis is calculated. Circularity is used as a measure of closeness of circular shape. Circularity has a value between 0 and 1, with 1 corresponding to a perfect circle. For a given perimeter of a shape, a circle has the maximum area among all the shapes. The circularity of each of the blobs 543 of interest is calculated as a ratio of the area of the given blob 543 to the area of a circle having the same perimeter as the given blob 543. A circularity value of 0.8 or higher is considered to be sufficiently circular to be deemed a circle. This takes into account cases where a circle appears to be an ellipse (or other distorted shape) due to folds in the clothing, position of the model wearing the clothing, or other transformation artifacts. The radii of the blobs 543 determined to be circles are also estimated to remove outliers and determine the repeatability of spacing between adjacent "circles."

Based on such analysis (e.g., identification of sufficient numbers of circles and set spacing between circles), the pattern module 308 determines whether a polka dot pattern is present in the inventory image (sub-block 466). FIG. 5I shows an image 544 in which detected polka dots 546 is shown.

If a pattern (e.g., polka dot pattern) is detected (yes branch of block 408a), the pattern module 308 determines a confidence score or level for the polka dot pattern detection in the inventory image (block 410a). As an example, if the blobs 543 have an average circularity value of 0.9, the corresponding confidence score may be higher than blobs of another image having an average circularity value of 0.82. At the block 410a, the indexing module 310 is also configured to appropriately index and add the image feature data corresponding to the inventory image to the image index database 301. Image feature data includes the color histogram (extracted in block 406a), the pattern (detected in block 408a), and pattern confidence score. The inventory image can be indexed based on one or more attributes. For example, the image can be indexed according to its clothing style (e.g., dress, top, pants, outerwear, bag, etc.), colors, pattern, and the like to facilitate rapid look-up of matching items.

Figure 8:
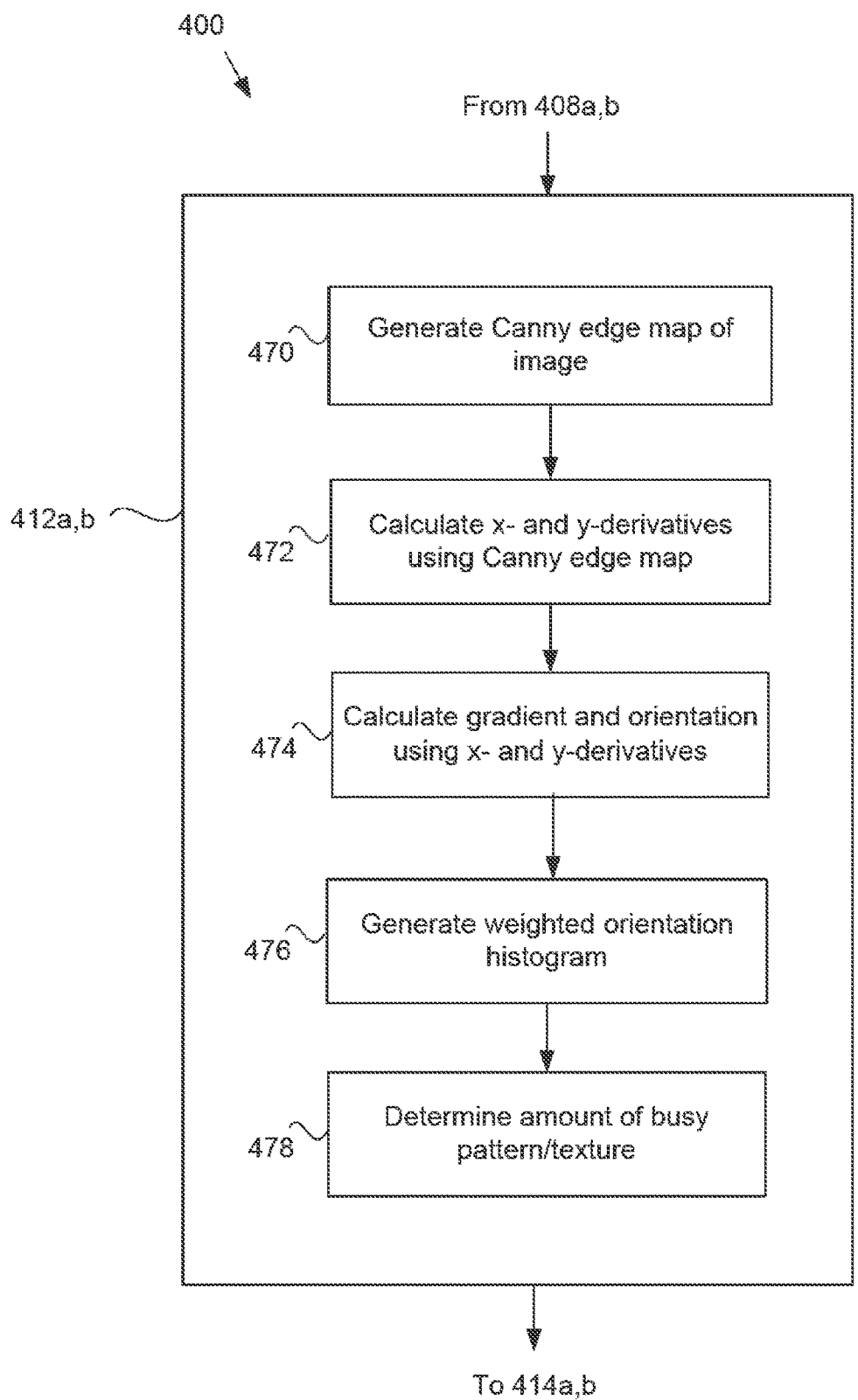

Otherwise a (polka dot) pattern is not detected (no branch of block 408a), and the flow diagram 400 proceeds to a block 412a. At the block 412a, the orientation histogram module 312 is configured to determine or measure the directionality of (other) pattern or texture as well as the complexity of the pattern/texture present in the inventory image. Details of the block 412a are provided in FIG. 8. At a sub-block 470 of FIG. 8, the orientation histogram module 312 is configured generate an edge map of the inventory image. As an example, the edge map may be obtained using a Canny edge detector. Next a sub-block 472, the orientation histogram module 312 estimates the x- and y-derivatives of the edge map using the Scharr operator. The x- and y-derivatives are then used to determine the gradient and orientation of the edge map at a sub-block 474.

At a sub-block 476, the orientation histogram module 312 applies a weight to each edge pixel (of the edge map) that is its edge magnitude. The result is a weighted orientation histogram. Such weighing of the edge pixels favors (or magnifies the existence of) strong edges and reduces the influence of weak edges, such as those caused by ruffles or shadows. The weighted orientation histogram is also normalized by the number of edge pixels.

Then at a sub-block 478, the orientation histogram module 312 sums the bins in the weighted orientation histogram to obtain a measure of the amount of busy pattern or texture. The greater the summed value, the greater the measure of busy pattern/texture. If a pattern/texture has a strong directionality, such as for a striped shirt, the entropy of the orientation histogram will be low, and vice versa. The entropy of the orientation histogram can be used as a measure of confidence in the orientation histogram.

Figure 5J:
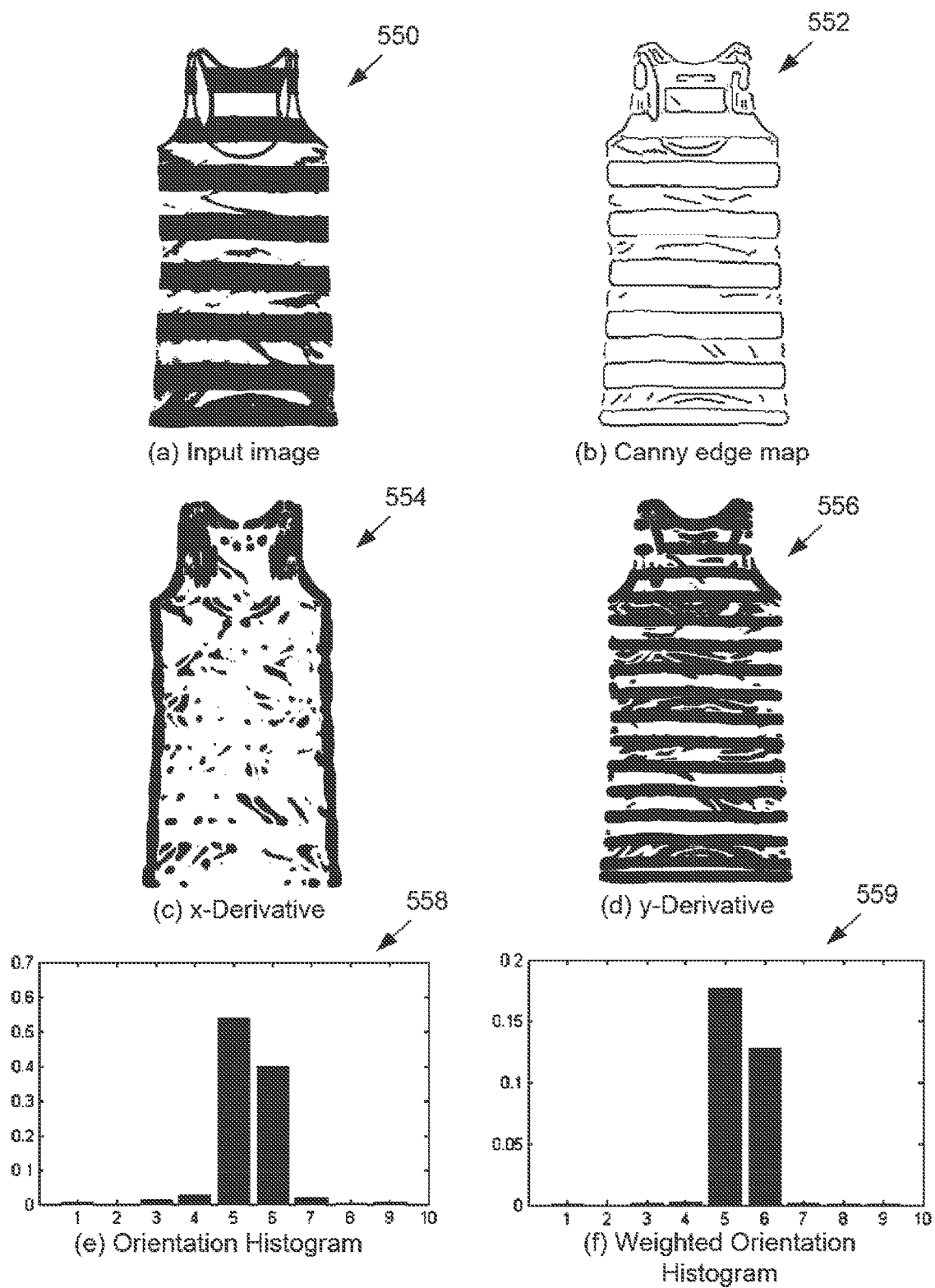
FIG. 5J illustrates processing of an image to generate an orientation histogram according to some embodiments.

FIG. 5J illustrates an example implementation of block 412a according to some embodiments. An image 550 shows a horizontally striped shirt. After application of a Canny map detector (sub-block 470), a Canny edge map 552 corresponding to the image 550 is generated. X- and y-derivatives of the Canny edge map 552 are shown as images 554 and 556. Notice that the y-derivative image 556 shows strong directionality in the horizontal direction consistent with the item being a horizontally striped shirt, while the x-derivative image 554 shows little feature of interest. Horizontal stripes have low x-derivative and high y-derivative features. This is also evident from the concentration of peaks and high peaks being in the center pat of the orientation histogram 558 of gradient orientation. Because the magnitude of the edge is high for horizontal stripes, applying such edge magnitude to the orientation histogram 558 results in a weighted orientation histogram 559 that magnifies those peaks and further reduces the lows.

Once the orientation histogram is extracted, a check is performed to determine whether the inventory image has low or high spatial frequency at a block 414a. Low spatial frequency corresponds to a pattern/texture that is minimally busy or in which the sum of the bins of the weighted orientation histogram is a low value. The weighted orientation histogram takes into account the strength of the discontinuities. Thus, for low contrast, but still a high spatial frequency pattern, this histogram shows a low value. This is a tradeoff in order to suppress noise from shadows, folds, and wrinkles. Examples of low spatial frequency include items with no pattern/texture or solid color items. Conversely, high spatial frequency (e.g., images with large amount of color spatial variation) corresponds to a busy pattern/texture or in which the sum of the bins of the weighted orientation histogram is a high value. Examples of high spatial frequency include items that have small and frequent polka dots, stripes, geometric patterns, animal prints, floral patterns, and the like.

For low spatial frequency, the flow diagram 400 proceeds to block 416a. At block 416a, the dominant color module 314 is configured to extract the dominant color of the inventory image. The dominant color comprises the color that is present on the most spatial area relative to other color(s) within the swatch area of the inventory image. Thus, even if the sampling mask area includes more than one color, one of those colors can be the dominant color.

In one embodiment, the dominant color module 314 is configured to cluster the colors from all pixels in the swatch area in accordance with LUV color space, and identify the largest cluster from among such clusters of colors. The color corresponding to the largest cluster is the dominant color. Using LUV color space, the colors are clustered K-means with k=8. The initial cluster centers are selected using the K-means++ scheme, where centroids are picked to be as far apart as possible given the first randomly picked centroid. Details about the K-means++ scheme is provided in David Arthur, et al., "K-means++: The advantages of careful seeding," SODA 2007 Proceedings of the $18^{th}$ annual ACM-SIAM symposium on discrete algorithms, 1027-1035 (2007).

Figure 5K:
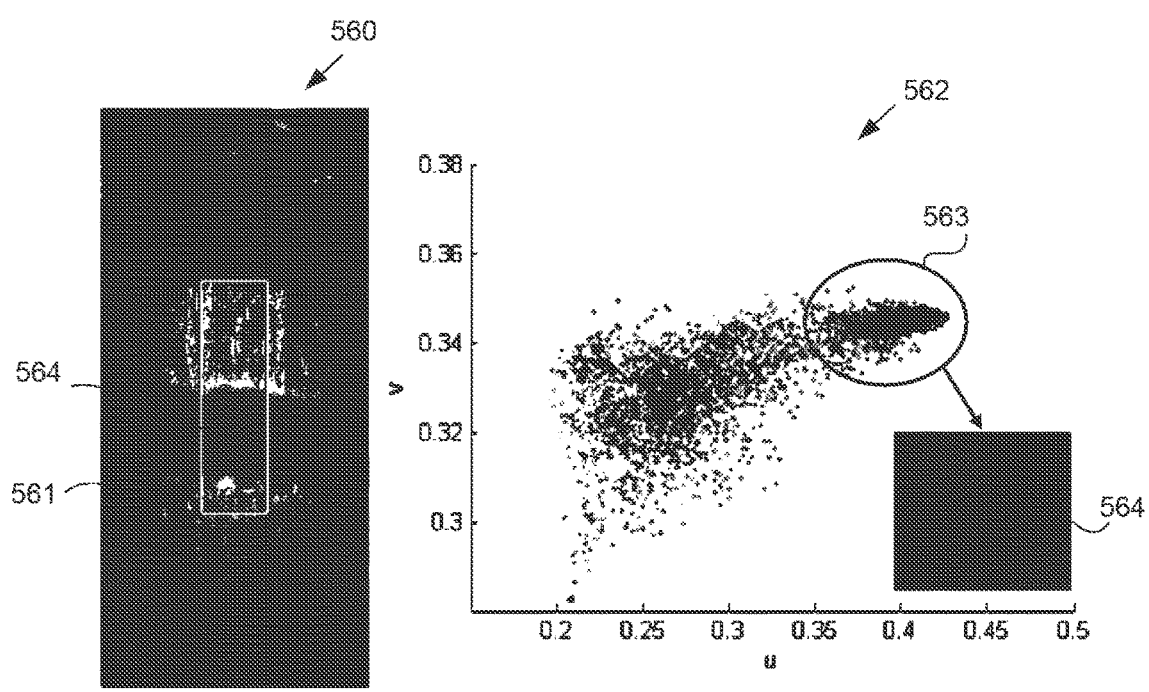
FIG. 5K illustrates an example dominant color determination using a color space plot according to some embodiments.

FIG. 5K illustrates an example image 560 and its swatch area 561. A scatter plot 562 corresponding to the swatch area 561 is shown, the scatter plot 562 shown in the U-V space of the LUV color space. Each point on the scatter plot 562 corresponds to a pixel within the swatch area 561, in which each point is color coded with the true color of the corresponding pixel. As can be seen in scatter plot 562, the largest/dominant cluster of a single color is cluster 563. The color of cluster 563 is a coral color 564, and this is the dominant color of the swatch area 561 and by extension, of the image 560. The dominant color identified via the scatter plot 562 is the same as the color 564 that occupies the largest area within the swatch area 561.

In an alternative embodiment, the dominant color module 314 is configured to re-use the hue H values in the stacked 1D histogram from block 406a. With reference to FIG. 5H, the bin within the bin group 533 (corresponding to the H values for color pixels within the swatch area) having the highest peak represents the dominant color for the swatch area/image 530. In FIG. 5H, the highest peak within bin group 533 is at bin 17. Bin 17 corresponds to a bluish purple color. And in fact, the dominant color is image 530 is a bluish purple color.

Once the dominant color is identified, at a block 418a, the dominant color module 314 determines a confidence score or level for the dominant color detected in the inventory image using the color histogram. As an example, confidence of dominant color is low if the image has multiple colors with similar spatial span (as shown in the color histogram). Conversely the confidence is high if the image is a solid color.

The confidence score can be a binary value (low or high) or it can be a quantitative value between, for example, a score of 0 to 1. For block 418a, the indexing module 310 is also configured to appropriately index and add the image feature data corresponding to the inventory image to the image index database 301. Image feature data includes the color histogram, orientation histogram, dominant color, and dominant color confidence score. The inventory image can be indexed based on one or more attributes. For example, the image can be indexed according to its clothing style (e.g., dress, top, pants, outerwear, bag, etc.), color histogram, dominant color, and the like to facilitate rapid look-up of matching items.

If the spatial frequency is high, then the orientation histogram module 312 is configured to determine a confidence score or level for the orientation detected in the inventory image (block 420a). An image with high spatial frequency may or may not also have strong directionality or orientation. As an example, a horizontal striped shirt exhibits strong orientation, and thus its orientation confidence score is high. The confidence score can be a binary value (low or high) or it can be a quantitative value between, for example, a score of 0 to 1. For block 420a, the indexing module 310 is also configured to appropriately index and add the image feature data corresponding to the inventory image to the image index database 301. Image feature data includes the color histogram, orientation histogram, orientation information, and orientation confidence score. The inventory image can be indexed based on one or more attributes. For example, the image can be indexed according to its clothing style (e.g., dress, top, pants, outerwear, bag, etc.), color histogram, orientation, high spatial frequency, and the like to facilitate rapid look-up of matching items.

Thus, image features of a given inventory image are extracted/identified and such image features are stored in the image index database 301 appropriated indexed to facilitate rapid look-up in response to query images. By repeating blocks 402a-420a as many times as needed, all of the inventory images corresponding to certain item types can be similarly indexed.

With the inventory images indexed, FIG. 4 will be described in the context of the matching phase 442. At a block 402b, the image capture module 302 is configured to receive a query image. In one embodiment, the query image is sent by a device machine 110 or 112 to the networked system 102. A user of the device machine 110 or 112 (e.g., a smartphone) may take a photograph of a color, pattern, textile, clothing, a portion of a clothing such as a sleeve, or the like to capture an image of interest using the camera included in the device machine 110 or 112. The photograph is transmitted to the networked system 102, to be the query image, for image feature extraction and to return inventory images matching the query image.

For blocks 404b-408b and 412b-416b, the same operations as described above for blocks 404a-408a and 412a-416a are performed except the operations are taken on the query image instead of an inventory image. If a pattern is detected at block 408a, then at block 410b, the pattern module 308 determines the pattern confidence score of the query image similar to the determination described in block 410a. For block 410b, the comparison module 316 is configured to compare the color histogram of the query image to the color histograms of the inventory images to find one or more inventory images matching the query image. Possible similarity schemes include, but are not limited to, cosine similarity (inner product) correlation, Chi-squared correlation, intersection, and Bhattacharyya distance.

In one embodiment, the similarity score is calculated to be the complement of the Bhattacharyya distance. The Bhattacharyya distance comprises the square root of the complement of cosine similarity of the square root of the color histograms. The similarity score S between color histograms $H_1$ and $H_2$ is expressed as follows:

$$S(H_1, H_2) = 1 - \sqrt{1 - \frac{1}{\sqrt{\overline{H_1} \cdot \overline{H_2} N^2}} \sum_I \sqrt{H_1(I) \cdot H_2(I)}}$$

where N is the number of bins.

The similarity score (e.g., between 0 for completely dissimilar and 1 for exactly the same) is assigned for each pair of the query image and an indexed inventory image. The similarity scores are sorted so that matching results can be displayed on the device machine 110/112 in the order of similarity to the input query image.

Then at a block 422b, the comparison module 316 provides the matching results to the device machine 110/112 for display on the screen of the device machine 110/112. The matching results (e.g., inventory images and possibly associated item information) are displayed in order of degree of similarity to the query image. In some embodiments, the system or the user may set an upper limit on the number of matching results that may be presented in response to the query image.

If the query image has low spatial frequency (low branch of block 414b), then the query image's dominant color is extracted in block 416b. Next at a block 418b, the dominant color module 314 determines the dominant color confidence score using the color histogram from block 406b. If the confidence of the dominant color is low, the comparison module 316 compares the color histogram of the query image to the color histograms of the indexed inventory images (block 428b). Note that if the dominant color confidence score for the query image is a quantitative value, a pre-defined threshold value may be used to determine if the score is above or below the threshold value to determine a "high" or a "low," respectively. A similarity score is generated for each pair of images as described above with respect to block 410b. The similarity scores are similarly ordered from highest to lowest scores. Then the inventory images with the highest similarity scores, the matching results, are provided to the device machine 110/112 for display (block 422b).

On the other hand if the confidence of the dominant color is high, the comparison module 316 compares the dominant color of the query image to the dominant color of each of the indexed inventory images (block 430b). A similarity score is assigned for each pair of the query image and indexed inventory image, and the similarity scores are ordered. Then the flow diagram 400 proceeds to block 422b to provide the matching results to the device machine 110/112. Note that if an inventory image has low confidence for dominant color, it will be "penalized" or considered to be dissimilar to a query image that has high confidence for dominant color.

At a block 420b, the orientation histogram module 312 is configured to determine the confidence score for the orientation of the query image, similarly as described above with respect to block 420a. If the confidence score for orientation/directionality is low, then at a block 424b, the comparison module 316 compares the color histogram of the query image to the color histograms of the indexed inventory images. Note that if the confidence score for the query image is a quantitative value, a pre-defined threshold value may be used to determine if the score is above or below the threshold value to determine a "high" or a "low," respectively. A similarity score is generated for each pair of images as described above with respect to block 410b. The similarity scores are similarly ordered from highest to lowest scores. Then the inventory images with the highest similarity scores, the matching results, are provided to the device machine 110/112 for display (block 422b).

On the other hand, if the confidence score for orientation/directionality is high, then at a block 426b, the comparison module 316 performs two comparisons for each pair of query image and an indexed inventory image: a comparison of the color histograms and also a comparison of the orientation histograms. A similarity score can be assigned for each comparison of the (color or orientation) histograms using the similarity score formula discussed above with respect to block 410b. For each image pair, the final similarity score is the sum of the color histogram comparison similarity score and the orientation histogram comparison similarity score. Then the matching results are provided to the device machine 110/112 for display at the block 422b.

Figure 9A:
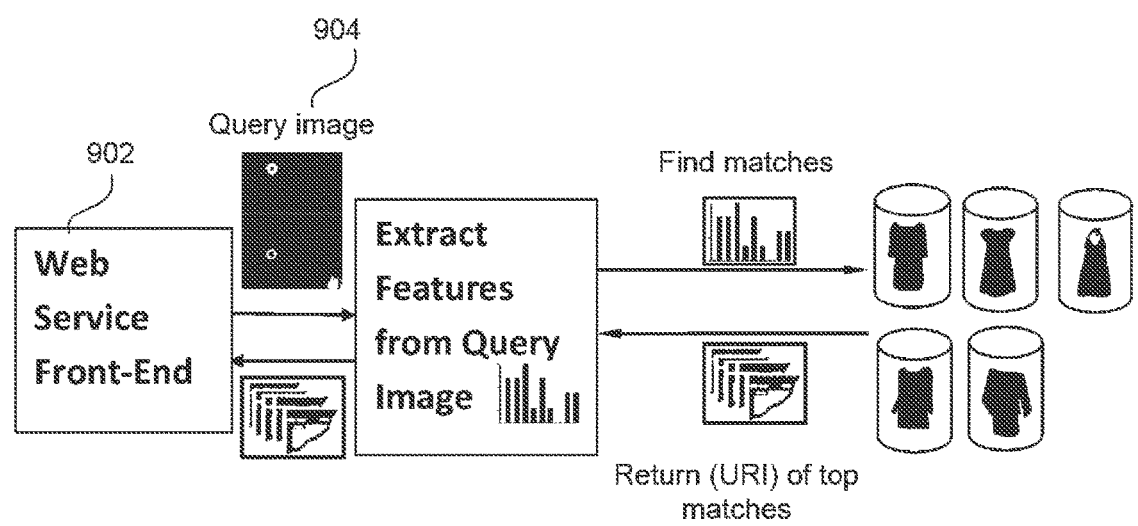
FIG. 9A illustrates a high-level block diagram of the matching phase according to some embodiments.

Accordingly, the image features (e.g., dominant color, color distribution, pattern, orientation, etc.) of the query image dictate what image features of the inventory images to compare against to obtain similarity scores between pairs of query image and an inventory image. FIG. 9A illustrates a high-level block diagram of the matching phase, in which the device machine 110/112 interfaces with the networked system 102 via a website 902 using a web browser. A query image 904 is sent to the networked system 102 to extract features from the query image. The networked system 102 uses the query image's extracted features to find matches to inventory images. The top matches are returned to the device machine 110/112 formatted in a match results web page.

Figure 9B:
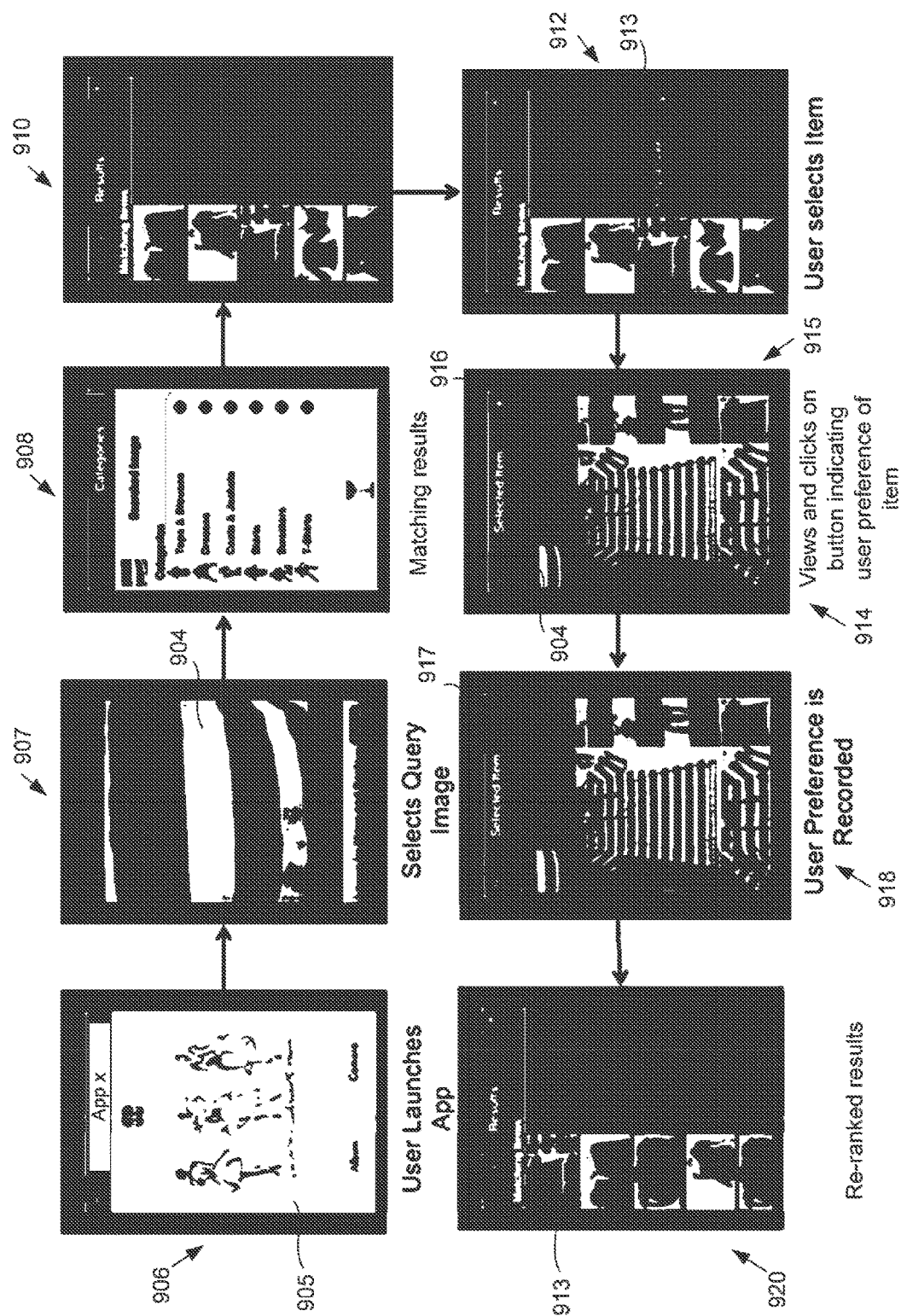
FIG. 9B illustrates user interface (UI) screens relating to the matching phase according to some embodiments.

FIG. 9B illustrates various user interface (UI) screens displayed on the device machine 110/112 pertaining to the matching phase according to some embodiments. In FIG. 9B, the device machine 110/112 has installed an app 905 to interface with the networked system 102 rather than access the website 902 hosted by the networked system 102. When a user launches the app 905 at the device machine 110/112 (as shown on screen 906), the app 905 facilitates the user to input or otherwise specify a query image 904. As an example, the app 905 may include camera capabilities (or otherwise access a separate camera app) to permit the user to take a photo/image of something that is colored and/or patterned. The query image 904 shown on screen 907 comprises blue and cream horizontal stripes, likely from an article of clothing. The app 905 transmits the query image 904 to the networked system 102, and in response, the networked system 102 performs image feature extraction operations and provides matching results as discussed above.

Screen 908 shows matching results displayed on the device machine 110/112. All items that are deemed to match the query image 904 matches at least the color distribution of the query image 904. Continuing the above example, each of the matching items contain at least blue and cream colors like the query image 904. The matching results may be organized by item categories, such as "tops and blouses," "dresses," "coats and jackets," "shirts," "sweaters," "T-shirts," and the like. If, for example, the user selects the "tops and blouses" category on screen 908, the matching items from that category are displayed to the user at a screen 910. The matching items are ordered from highest to lowest similarity score for that category. For each matching item, information such as, but not limited to, a color image and one or more of an item name, brand name, sizes, price, availability, or similarity score may be displayed. The user can select from among the displayed matching items, for example, a third ranked item 913 (a blue and white striped polo shirt), as shown in screen 912. In response, additional item details are provided about the selected item at a screen 916. The user can navigate within the matching results to view one or more items of interest. The user can also purchase an item of interest within the app 905 (not shown). Thus, a user can simply take a photo of something having a color and/or pattern that he/she likes, and the app 905 in conjunction with the networked system 102 automatically returns items available for purchase that matches that color and/or pattern.

When the inventory includes tens of thousands to millions of listed items, the number of matching results for a given query image can be prohibitively high. Especially when the matching results are viewed on smaller displays, as is common in smartphones and other mobile devices, viewing exhaustion can occur well before all of the matching items are viewed by the user. Even on larger displays, users are more likely to view top matching results than (much) lower matching results. Additionally in the context of apparel, when a user submits a query image containing a specific color and/or pattern, it is not obvious whether the user is interested in just the color distribution, the pattern, the category of apparel, apparel in general, or a combination of two or more features of the query image. In order to improve user engagement (which may increase the possibility of the user making a purchase) and personalize the user experience, user indications or preferences during interaction with the provided matching results are used to re-rank or re-order the items within the initial matching results to better suit the user's interest.

Figure 10:
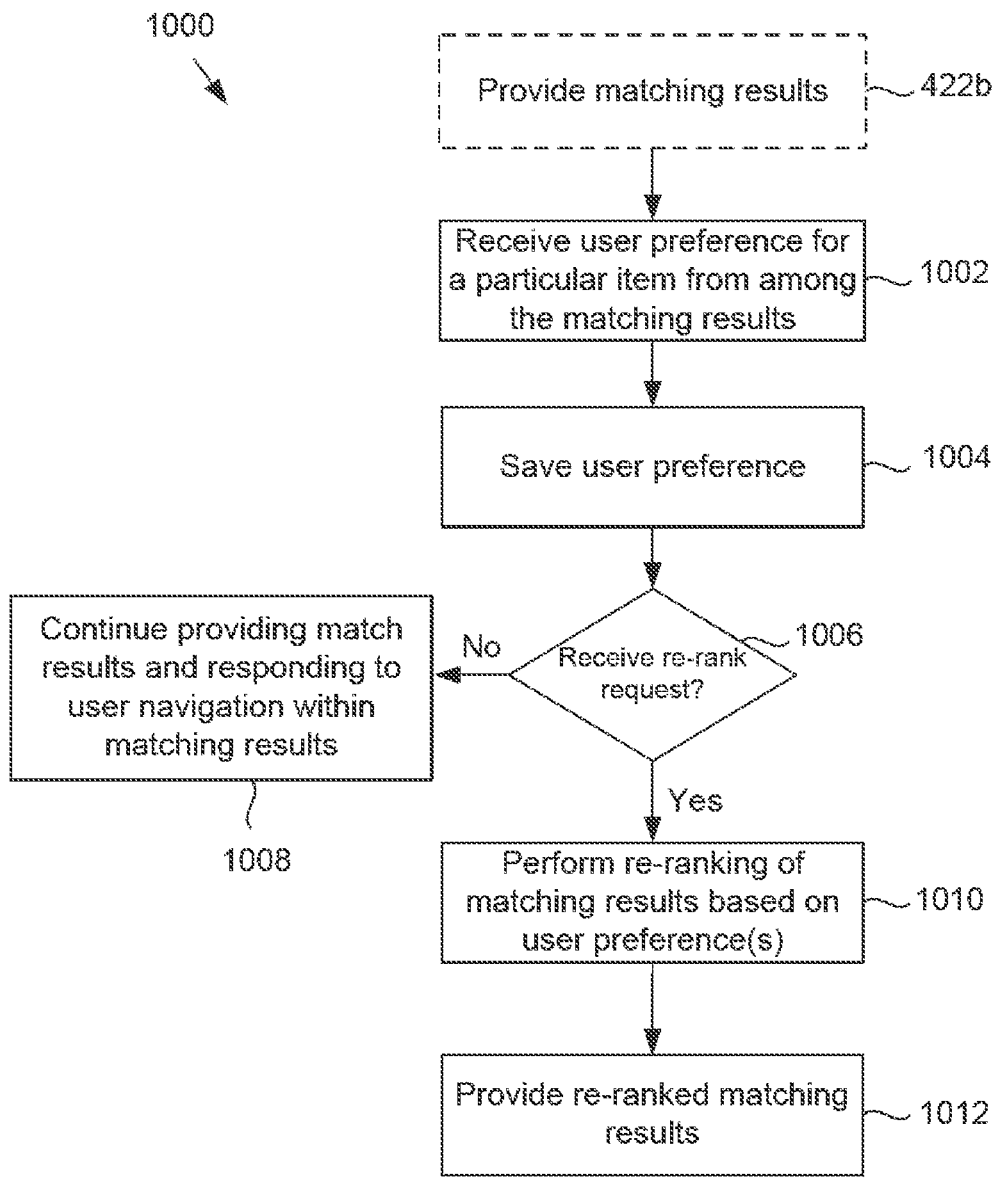
FIG. 10 illustrates an example flow diagram for performing re-ranking operations according to some embodiments.

FIG. 10 illustrates an example flow diagram 1000 for performing re-ranking operations according to some embodiments. During user interaction with the matching results corresponding to a given query image at the device machine 110/112, the user may indicate a preference for or an interest in a particular item from among the match results. Continuing the example shown in FIG. 9B, the screen 914 includes item details 915 corresponding to the selected third ranked item 913 (e.g., larger image, additional images), a thumbnail of the query image 904, and a button 916 to affirmatively indicate user preference of that item. When the user actuates or clicks on button 916, the re-rank module 318 at the networked system 102 receives the user indication/preference for the particular item (block 1002). The user marked a particular item from among the match results as being relevant or of interest over other items in the match results.

Next at a block 10004, the re-rank module 318 saves the received user indication/preference. The screen 914 is correspondingly updated to a screen 918. The button 916 in screen 914 is replaced with a re-rank button 917 in screen 918. Actuation of or clicking on the re-rank button 917 by the user comprises a user request to re-rank or re-order the match results based on the user preference for the particular item. Alternatively, re-rank button 917 may be omitted and initiation of re-ranking may commence upon receiving user preference of a particular item. Although not shown, a user preference for more than one item within the match results can be indicated prior to initiation of re-ranking.

If no re-rank request is received (no branch of block 1006), then the networked system 102 continues to provide matching results and be responsive to user navigation within the matching results (block 1008). Otherwise a re-rank request is received (yes branch of 1006), and the re-rank module 318 performs re-ranking of the (initial) matching results based on the user preference(s) for one or more of particular items within the matching results (block 1010). Then at a block 1012, the re-rank module 318 provides the re-ranked matching results for display on the device machine 110/112. The re-ranked matching results comprise refinement of the initial matching results in accordance with additional user input regarding item(s) of interest within the initial matching results.

Returning to FIG. 9B, screen 920 shows the initial matching results shown on screen 910 re-ordered based on the user preference for the (initially) third ranked item 913 (a blue and white striped polo shirt). Notice that the re-ranked results comprise the (initially) third ranked item 913 as the first ranked item and more of the top results are striped pattern items in comparison to the initial results.

As an example, the query image is a striped yellow dress and the networked system 102 weighs patterns at 60% and color at 40%. Accordingly, more striped clothing may show up as top results and not all of them yellow. The user viewing the recommendation results may pick (indicate user preference for) the one or more yellow dresses but not show a preference for the non-yellow clothing items. The system re-ranks the recommendation results based upon such preference, resulting in pushing up the listings of yellow dresses to the top over non-yellow clothing items.

The re-ranking operation can be repeated more than once for a given matching results in response to new or additional preference for certain item(s) within the matching results provided by the user.

In some embodiments of block 1010, the re-rank module 318 may include as one or more of the top re-ranked results (e.g., within the top five, top ten, or top twenty results) an item from among the initial matching results that differs from the image feature that the other top results will be selected for. An explore-exploit paradigm can be included in the re-ranking. Instead of showing the most matching (and/or complementary) items, diverse items can also be included as top results to allow the user to explore various diverse inventories pivoted to the query image. Continuing the example of FIG. 9B, the image feature of interest appears to be the horizontal striped pattern of the third ranked item 913. Thus, the top re-ranked results shown on screen 920 are dominated by horizontally striped items. However, rather than the horizontal stripe pattern, the user may actually be expressing a preference for stripes in general (horizontal stripes, vertical stripes, diagonal stripes, etc.) or items having approximately equal amounts of blue and cream colors regardless of the pattern by indicating a preference for the third ranked item 913. In order to test this "theory," the re-ranked module 318 can include an item from among the initial matching results that has a blue and cream colored floral pattern or vertical stripe pattern as one of the top re-ranked results. Then if the user subsequently indicates a preference for such item, then the "theory" may be correct and the latest matching results can be further refined accordingly.

Figure 11:
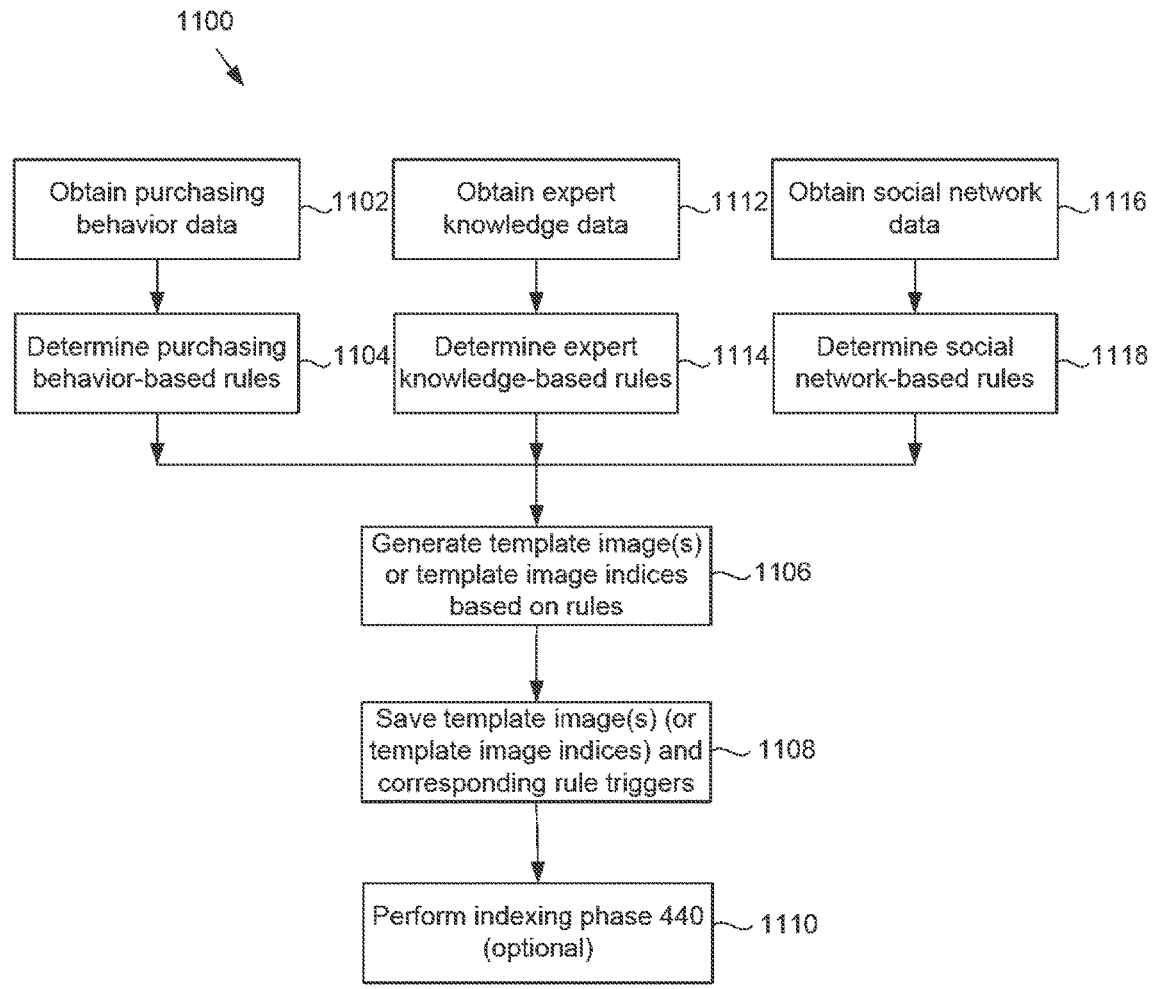
FIG. 11 illustrates an example flow diagram relating to establishing recommendation schemes in order to provide complementary results according to some embodiments.

In addition to or as an alternative to providing matching results in response to receipt of a query image, the networked system 102 can provide complementary results based on the query image. FIG. 11 illustrates an example flow diagram 1100 relating to establishing recommendation schemes in order to provide complementary results according to some embodiments. FIG. 11 is discussed below in conjunction with FIG. 4.

At a block 1102 of FIG. 11, the complement module 320 is configured to obtain purchasing behavior data (e.g., from purchases made using the networked system 102). Purchasing behavior data comprises correlations between particular items that users have purchased together. For example, the purchasing behavior data may show that 60% of users that purchase a particular item A also purchase item B, either simultaneously or within a certain time period of each other. The purchasing behavior data may also show that 10% of users that purchase item A also purchase item C, either simultaneously or within a certain time period of each other. Thus, the correlation between items A and B is higher than the correlation between items A and C. Items A, B, and C may be same category of items to each other (e.g., dresses) or different categories of items to each other (e.g., a dress, shoes, and handbag).

Next at a block 1104, the complement module 320 determines rules (also referred to as correlation rules, complementary rules, or recommendation rules) based on the purchasing behavior data. Continuing the above example of items A, B, and C, because the image features of these items have been extracted and are indexed in the image index database 301, the complement module 320 can generate rules that comprise correlation rules between image features corresponding to items A and B, for example, as opposed to between specific items A and B only. The rules define for each of a given particular image index, which other image indices would be best complements. An image index comprises a particular image feature data profile as well as item category specification (e.g., dress, shirt, pants, dress, shoes, handbag, scarf, bedding, etc.). Using these rules, for example, recommendations can be made as to which handbags best complement a particular skirt or which scarf is complementary to which shoes, even if one or more of these exact items have no purchase history because the image feature data and item category data of the items are applied against the rules to determine complements.

Once the purchasing behavior data-based rules are defined, the complement module 320 generates one or more template images (also referred to as test images, complementary template images, recommendation template images, and similar variants) embodying the rules established in block 1106. The template image(s) can be certain inventory image(s) from which a rule was derived. Or it could be a new image that comprises a composite of a rule that generalized trends or other behavior extracted from the purchasing behavior data. Alternatively, instead of generating template image(s), template image indices (including image feature data as would be obtained after an image is processed in the indexing phase 440 and item category information) embodying the rules can be generated instead.

The generated template images or image indices are saved in a database (such as databases 126) for later retrieval (block 1108). In the case of generated template images, these images are run through the indexing phase 440 (see FIG. 4) to extract their image feature information (block 1110). Block 1110 is optional if template image indices already exist, such template image indices being stored in the image index database 301. One or more rule triggers corresponding to the template images or image indices are also stored in a database. Rule triggers define particular conditions under which a specific template image or image index is used during the complement phase, as discussed in detail below.

At a block 1112, the complement module 320 is configured to obtain expert knowledge data. Expert knowledge data comprises current fashion trends (e.g., color blocking), what celebrities are wearing, what designers are working on, reoccurring themes at fashion shows, color science, color charts, and other current color/texture combination data from expert sources. The expert knowledge data can be expressed in images (e.g., photos of celebrities or runway models wearing certain outfits and accessories) and/or non-pictorial form (e.g., text of noticed fashion trends, such as color blocking in general being popular). In the case of color science, for example, there may exist scientifically based vocabulary of color schemes and themes. Additional details regarding complementary color schemes and themes are provided at http://www.dgp.toronto.edu/~donovan/color/colorcomp.pdf and http://chenlab.ece.cornell.edu/people/congcong/publications/IJSTSP_Aesthetics.pdf.

Next at a block 1114, the complement module 320 determines or establishes one or more rules based on the expert knowledge data. The fashion trends may be distilled down to rules specifying which color combinations are pleasing, which accessories would go with particular outfits, and the like. As an example, suppose a color scheme that is currently popular is a combination of colors A, B, and C. If a query image contains colors A and B in an appropriate mix, then a rule may dictate recommending an inventory image in a color C and which features an apparel piece that may be worn with and is different from the article of clothing/accessory featured in the query image.

The rule(s) based on the expert knowledge data are used to generate one or more template images (or template image indices) at block 1106. The template images or image indices are saved in a database along with corresponding rule triggers at block 1108. If template image indices exist instead of template images, then block 1110 may be omitted. Additional details provided above of blocks 1106-1110 in the context of purchasing behavior data are also applicable for expert knowledge data. In some embodiments, celebrity or runway model photos showing certain fashion trends obtained in block 1112 may comprise one or more of the template images. Continuing the example of color combination A, B, and C being a popular color scheme, a celebrity photo may show a celebrity wearing an outfit and carrying accessories in colors A, B, and C. This celebrity photo may be considered to be a template image and run through the indexing phase 440 in block 1110 to extract its image feature data (e.g., color distribution of colors A, B, and C). The corresponding rule trigger for this template image may be if a query image contains color A, B, or C above a pre-defined threshold amount of area, then use this template image (or corresponding image index) to find matching complementary items from among the inventory images. In other embodiments, one or more template images or image indices may be configured based on the rules because there are no existing images that embody the rules.

At a block 1116, the complement module 320 is configured to obtain social network data. Fashion is a social statement, which is influenced by the social circle of a given individual while that same individual also influences those in his or her social circle. The complement module 320 monitors and extracts fashion trend information from social networks, and in particular, from social circles of users that have or may submit a query image to the networked system 102. The information pulled from social networks may include posted photos/images and textual content (such as a wish list, discussions of products, recent purchases, etc.).

Then at a block 1118, the complement module 320 determines or establishes one or more rules based on the social network data. The complement module 320 quantifies the choices and preferences of people in a user's social circle, and generates one or more rules based on this data. A different set of rules may exist for different groups of people, in which a group includes a user and members of his or her social circle. A set of rules for a given group of people may recommend, for example, to a person within the group to buy a particular clothing item because it complements their friends' purchases. The field of collaborative filtering may be applicable, which deals with text and other transactions data (see http://en.wikipedia.org/wiki/Collaborative_filtering).

The rule(s) based on the social network data are used to generate one or more template images (or template image indices) at block 1106. The template images or image indices are saved in a database along with corresponding rule triggers at block 1108. If template image indices exist instead of template images, then block 1110 may be omitted. Additional details provided above of blocks 1106-1110 in the context of purchasing behavior data and/or expert knowledge data are also applicable for social network data. In some embodiments, photos/images posted on a user's or user's friends' social network page may comprise a template image. In other embodiments, one or more template images or image indices may be configured based on the rules because there are no existing images that embody the rules.

Although three recommendation learning sources—purchase behavior, expert knowledge, and social networks—are shown in FIG. 11, it is understood that fewer than three recommendation learning sources may be used to obtain the template image indices and corresponding rule triggers. It is also understood that even if all three recommendation learning sources are used to obtain respective template image indices and corresponding rule triggers, that one or more of the recommendation learning sources may be preferred in certain situations over others when making recommendations to a use in response to a query image. The item category for a given item may be provided by the seller when the item is being listed, may be automatically detected by a product identification number corresponding to the item, or may be automatically detected during image processing.

With the template image indices and rule triggers established, a complement phase commences to recommend one or more complementary items from among the listed items (or items offered for sale) in response to a query image. As shown in FIG. 4, the operations of complement phase 444 are similar to that of the matching phase 442 except as described below. It is understood that prior to commencement of the complement phase 444, indexing phase 440 occurred to index the inventory images as would be done before matching phase 442.

In the complement phase 444, a user interfaces with the networked system 102 via a website or an app installed on the device machine 110, 112 and provides a query image to the networked system 102 (same as in the matching phase 442). The query image is received at block 402b. The query image is processed to extract its image feature data in blocks 404b-408b and 412b-420b as described above with respect to the matching phase 442.

The operations of blocks 410c, 424c, 426c, 428c, and 430c correspond respectively to operations of blocks 410b, 424b, 426b, 428b, and 430b except as follows:

Instead of comparing and calculating a similarity score between each pair of the query image and a given inventory image, the comparison and calculation of the similarity score occurs between each pair of a template image and a given inventory image.

The particular template image of the pairing is based on the query image. The image feature data of the query image triggers selection of a particular rule trigger. The particular rule trigger, in turn, has a corresponding template image.

One or more different template images may be used depending on the number of rule triggers that are applicable for the query image.

In the matching phase 442, flow diagram 400 looks for inventory items having the same or nearly the same image features as that of the query image. By contrast, in the complement phase 444, flow diagram 400 looks for inventory items that are complementary to the query image. This means that "ideal" inventory items should not have the same or nearly the same image features as that of the query image. Instead, "ideal" inventory items are those items having the same or nearly the same image features as whatever an ideal complementary inventory item should have in accordance with the recommendation/complement rules established in FIG. 11. Template images serve as such ideal complementary inventory items; use of template images for comparison and similarity scoring against inventory images provides a mechanism to determine inventory items that are the most or nearly the most complementary to the query image.

Lastly, at block 422c, the comparison module 316 provides recommendation or complementary results to the device machine 110, 112 for display. As with the matching phase 442, the inventory items comprising the recommendation/complementary results may be grouped by item category and ordered from highest to lowest similarity score within each group to facilitate orderly presentation on the device machine 110, 112. The results are displayed on device machine 110, 112 similar to that shown on screens 908, 910, 912 of FIG. 9B. The user can navigate within the recommendation/complementary results as he/she would with the matching results (e.g., similar to screens 914, 918, 920 of FIG. 9B). In some embodiments, the colors and/or patterns of each of the items included in the complementary results are different from the colors and/or patterns of the query image.

Figure 12:
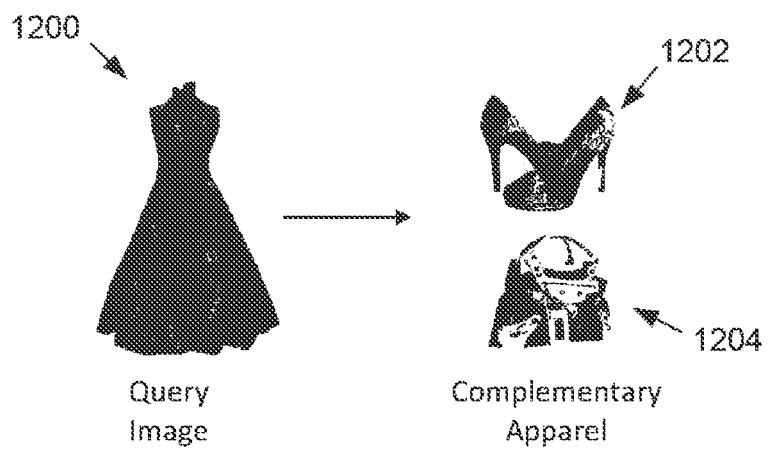
FIG. 12 illustrates an example (portion of the) recommendation/complementary results in response to a query image according to some embodiments.

FIG. 12 illustrates an example (portion of the) recommendation/complementary results 1202, 1204 in response to a query image 1200. Notice that results 1202, 1204 can be different categories of items from that of the item featured in the query image 1200. Query image 1200 shows a dress. Results 1202, 1204 are shoes and handbag, respectively.

An alternative way to obtain the query image—other than the user taking a photo and uploading it to an e-commerce site or online marketplace hosted on the networked system 102 via an app or website on the device machine 110 or 112—is from websites not associated with the e-commerce or online marketplace. In fact, the web sites can be competitor websites, online retailers' websites, fashion websites, social network websites, or any website comprising Hyper Text Markup Language (HTML)-based web pages (including HTML5-based web pages). Moreover, the matching and/or recommendation results corresponding to the query image sourced from a given website can be provided within the same given website. In other words, the matching and/or recommendation results need not be provided in a different website/web page from the given website that provided the query image. These functionalities are facilitated by a browser plugin installed on the device machine 110 or 112, as described in detail below.

Figure 13:
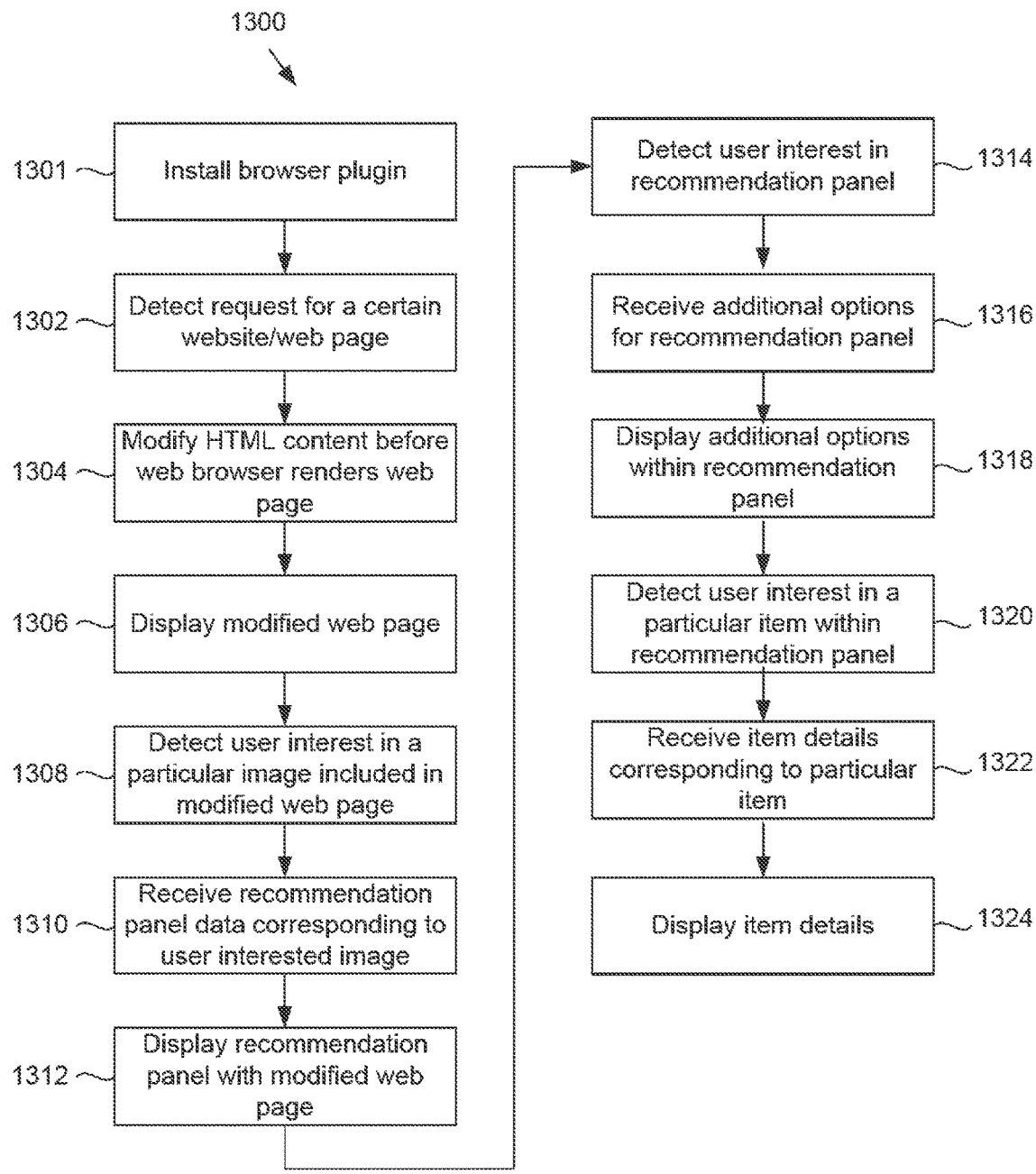
FIG. 13 illustrates an example flow diagram for recommending inventory items offered by an e-commerce or online marketplace at websites not associated with the inventory items' e-commerce or online marketplace according to some embodiments.

FIG. 13 illustrates an example flow diagram 1300 for recommending inventory items offered by an e-commerce or online marketplace at websites not associated with the inventory items' e-commerce or online marketplace according to some embodiments. In situ acquisition of a query image, presentation of inventory item recommendations corresponding to the query image, and viewing of item details corresponding to one or more items included in the item recommendations occurs in a web page not associated with the inventory items' e-commerce or online marketplace.

At a block 1301, a browser plugin provided by the networked system 102 (e.g., application servers 118) is installed on the device machine 110 or 112. The browser plugin comprises a browser extension, jquery snippet of code, or browser plugin. The browser plugin can be a standalone module or part of an app, such as app 905 (FIG. 9B). The browser plugin includes at least the browser plugin module 322.

Next at a block 1302, the browser plugin module 322 is configured to monitor web browser activity at the device machine 110 or 112 to detect a request for a certain website (or web page). The request comprises user entry of a uniform resource locator (URL) address in a web browser included in the device machine 110 or 112, or the user clicking on a hyperlink to a web page. The certain website comprises a website (or web page) from among a plurality of websites (e.g., competitor websites, online retailers' web sites, fashion websites, social network websites, or any website comprising HTML-based web pages) from which a query image can be sourced and recommendation items can be presented to the user without leaving that website (or web page). Such a website (or web page) may also be referred to as a query image source or external third party query image source. In response to detection of the request for a certain website (or web page), the browser plugin module 322 is configured to modify the HTML content of the web page before the web browser renders the web page on the screen of the device machine 110 or 112 (block 1304). On-the-fly changes to HTML content is made using Document Object Model interface. The IMG HTML tags are parsed. For example, the <img/> HTML tags can be parsed. If they are <img/> tags inside a <table/>, they are selected over <img/> tags outside <table/>. Also <img/> elements with a link follow through or call back is given higher priority than isolated <img/> elements. Modification to the requested web page includes, but is not limited to, changing the callback or follow through link.

The modified web page is displayed on a screen of the device machine 110 or 112 at a block 1306. At a block 1308, the browser plugin module 322 and/or the user interest detection module 324 is configured to detect user interest in or attention on an image included in the modified web page. In one embodiment, user interest in an image is detected when the user hovers a pointing device (e.g., mouse, trackpad, trackball, finger, etc.) at or near a particular image for at least a minimum time period. In another embodiment, user interest in an image is detected by tracking the user's eye movement as he or she is viewing the web page. The human eye rapidly scans interesting parts of a presented scene/content. This motion is called saccade. Eye tracking schemes are capable of identifying what part of a scene/content the eye is focusing on. Front-facing cameras included in smartphones and tablets may track eye movement as the user views the web page on the device's screen. In alternative embodiments, the browser plugin module 322 can provide one or more graphical user interface (GUI) tools for the user to explicitly specify interest in a given image included on the web page. Example GUI tools include, but is not limited to, a pointing tool, a highlighting tool, an area indictor tool, and the like. Whatever the particular way to detect user interest in an image, the detection comprises identifying the user's spatial attention to a specific portion of the displayed web page.

Figure 14A:
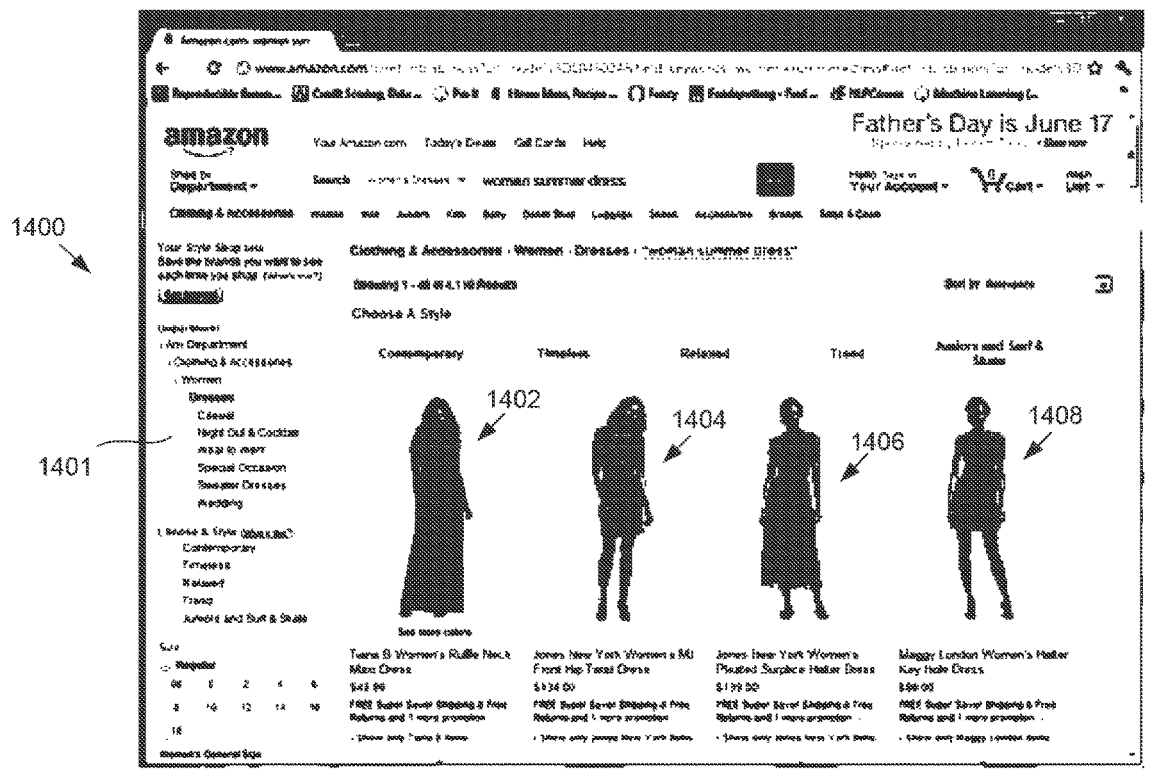
FIGS. 14A-14E illustrate example UI screens relating to implementation of the flow diagram of FIG. 13 according to some embodiments.
Figure 14B:
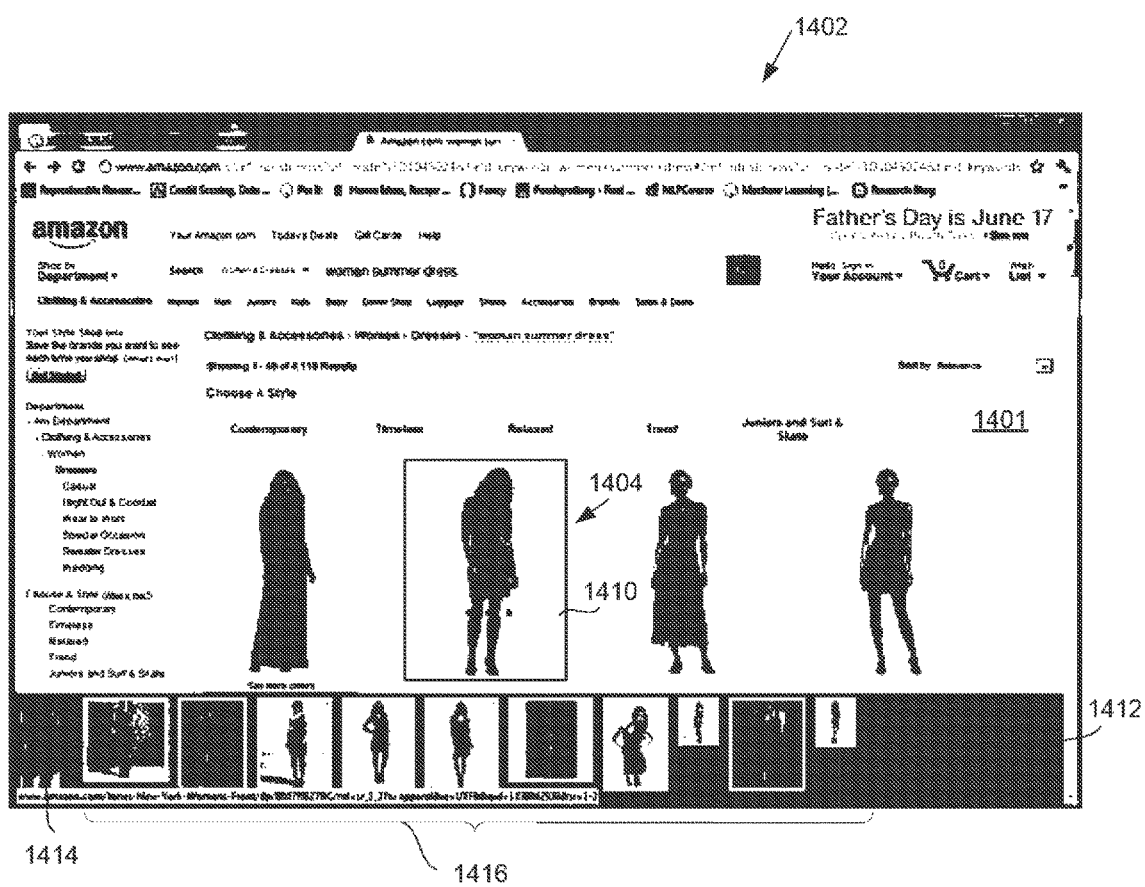

FIG. 14A illustrates an example screen 1400 displaying a (portion of a) web page 1401 of an online retailer (e.g., amazon.com). Web page 1401 includes at least four images 1402, 1404, 1406, and 1408 of dresses offered for sale by the online retailer. Although web page 1401 displays prices of the four dresses, the user is unable to compare prices with other retailers' offerings without taking attention off of web page 1401. FIG. 14B illustrates an example screen 1402 displaying the web page 1401 in which the user expresses interest in image 1404. In response to the detection, an image of interest indicator 1410 is shown (e.g., overlaid) on the web page 1401 corresponding to the image to be sampled to find matches. Indicator 1410 may comprise a rectangular rubber band. Alternatively, indicator 1410 is optional and need not be shown to the user.

Once a user interested image is detected, the browser plugin module 322 receives recommendation panel data corresponding to the user interested image at a block 1310. The user interested image (e.g., image 1404) comprises the query image that is automatically applied to the matching phase 442 and/or the complement phase 444 (see FIG. 4) to present items offered for sale by unrelated (and non-affiliated) e-commerce site or online marketplace to the web page/website being displayed. The results of the matching and/or complement phases 442, 444 are included in the recommendation panel data. At a block 1312, a recommendation panel (also referred to as recommendations, item recommendations, matching items, complementary items, and the like) is rendered on the web page using the recommendation panel data received from the networked system 102. The recommendation panel may comprise a floating panel, bar, or area that can be located at the bottom, top, side, middle, or any portion of the screen. The recommendation panel may be fixed, floating, or moveable on the screen. The recommendation panel may be an opaque or translucent overlay over a portion of the web page.

An example recommendation panel 1412 is shown at the bottom of the screen 1402 in FIG. 14B. The recommendation panel 1412 includes a query or sampled image 1414 that is the swatch portion of the image 1404. Image 1414 is optional. The recommendation panel 1412 also includes images of the inventory items that best matches and/or complements the image 1404. As an example, the top five, ten, or other pre-defined number of best matches/complementary items can be displayed.

Figure 14C:
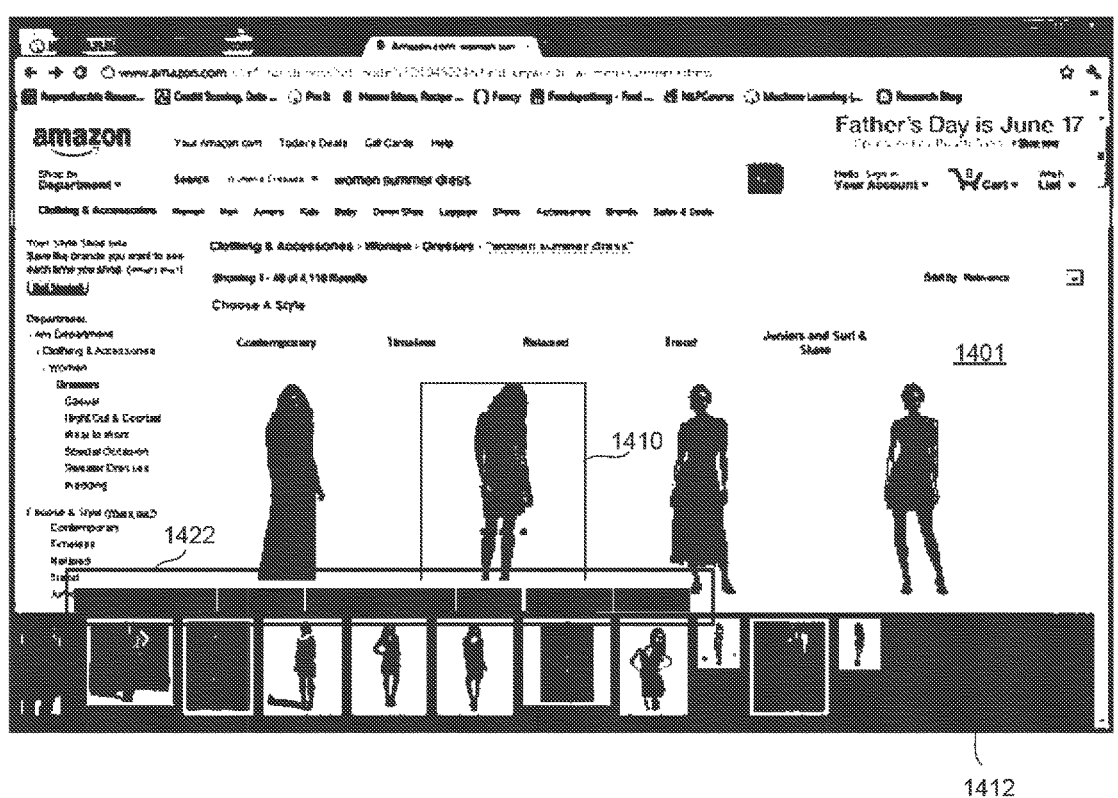

Next at a block 1314, the browser plugin module 322 and/or user interest detection module 324 is configured to detect user interest in the recommendation panel. Similar to the discussion above for block 1308, user interest can be detected by mouse hover, eye gaze, or user explicit action on or near the recommendation panel. In response to such detection, additional options or data for the recommendation panel is received from the networked system 102 (block 131) and displayed (block 1318). FIG. 14C shows a screen 1420 displaying the web page 1401 and the recommendation panel 1412. The recommendation panel 1412 now includes additional options or data 1422 showing more recommendation-related options to the user. For example, item category tabs are displayed, each tab corresponding to top matching and/or complementary inventory items in the respective item category (e.g., tops and blouses, skirts, sweaters, handbags, shoes, etc.).

Figure 14D:
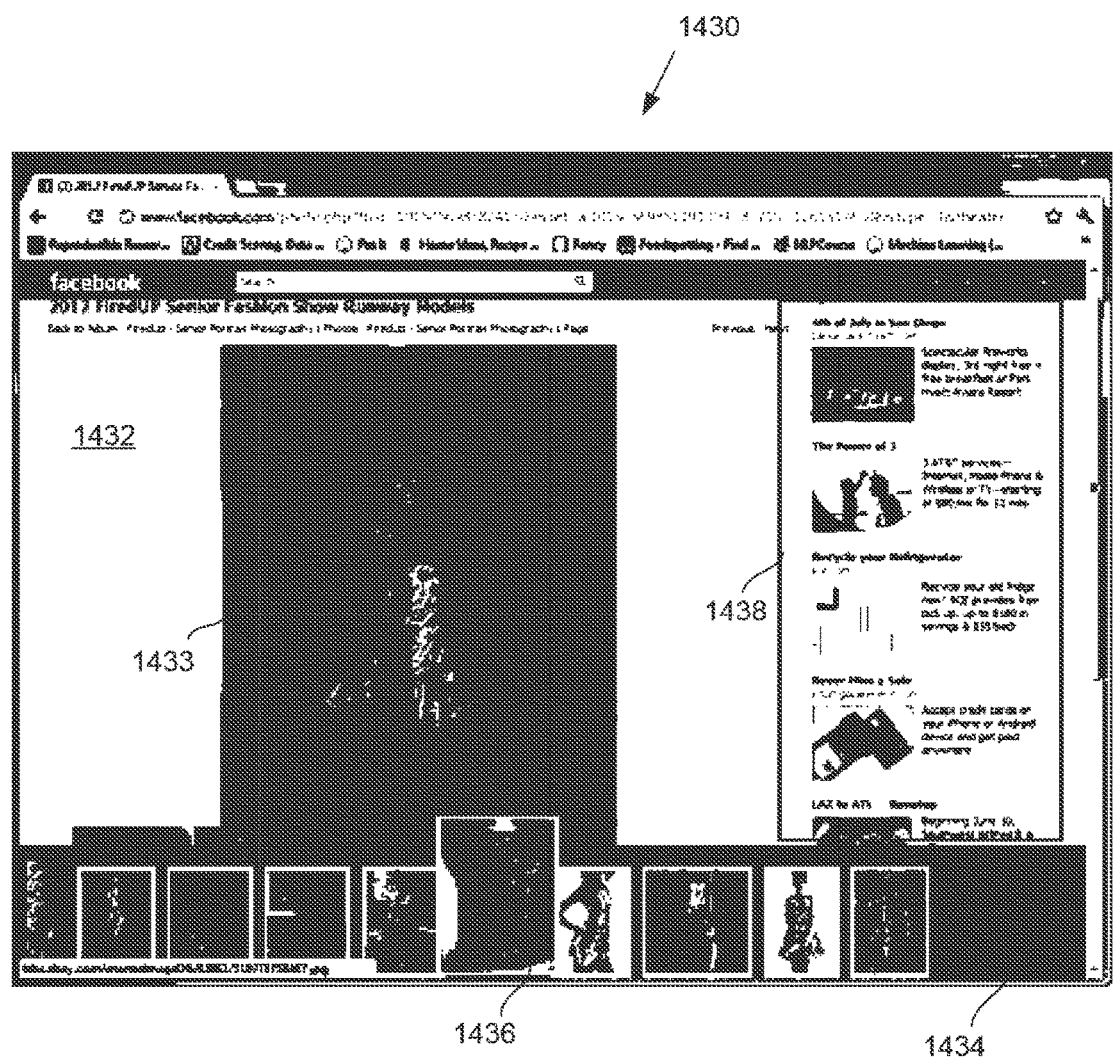

When the user expresses interest in one of the recommended items, such as by moving a mouse over or pointing to a particular item image within the recommendation panel, the browser plugin module 322 and/or user interest detection module 324 detects the user interest at a block 1320. In some embodiments, the image of the particular item will be enlarged in response, as shown in FIG. 14D. Image 1436 is larger than the other images of items being recommended in the recommendation panel 1434. Screen 1430 shown in FIG. 14D displays a web page 1432 from a social network site (e.g., a Facebook page). An image 1433 included in the web page 1432 is the user interested image (query image). Notice that web page 1432 also includes advertisements 1438 or other images and/or text. Nevertheless, the recommendation panel 1434 does not present any items relating to advertisements 1438. Image 1436 is also very similar to the dress in image 1433 except for different sleeves.

When the user clicks on (or otherwise explicitly selects) the particular item image in the recommendation panel, item details corresponding to the particular item are received at a block 1322 and displayed at a block 1324. The item details are provided in a new web page dedicated to the item. An item detail information page may be a web page within the e-commerce or online marketplace website. The user may also purchase items displayed in the recommendation panel.

Figure 14E:
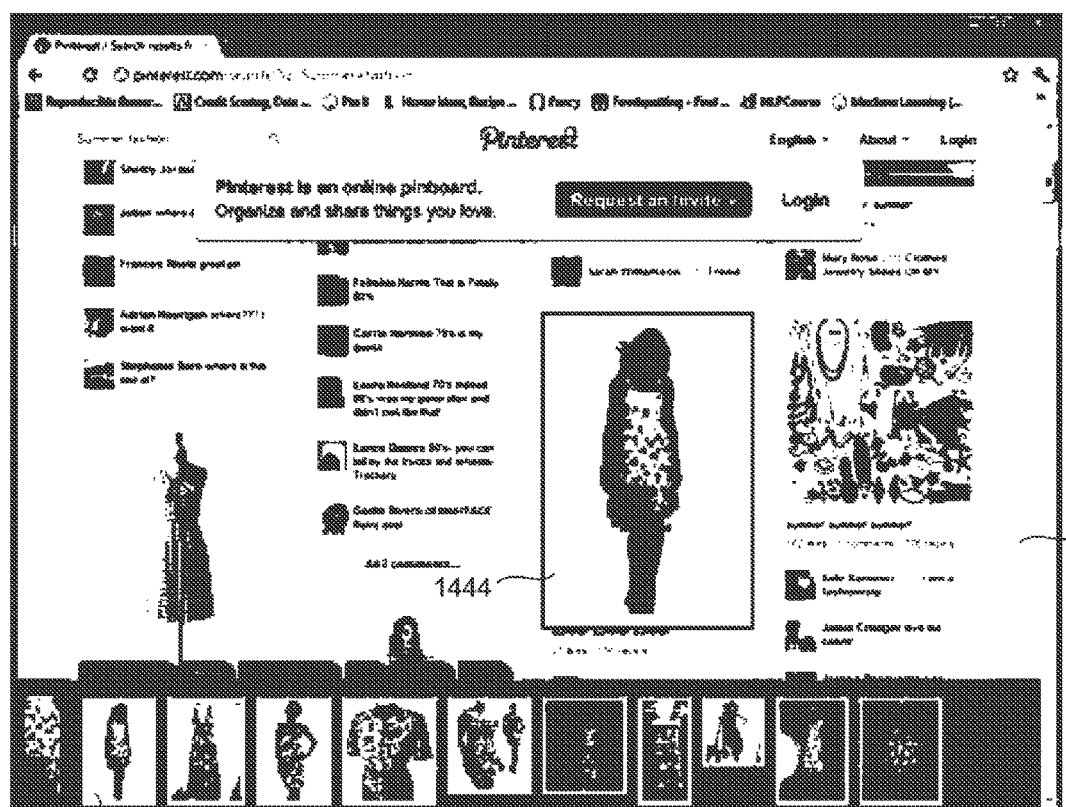

FIG. 14E illustrates a screen 1440 showing a web page 1442 from another social network site (e.g., Pinterest.com). An image 1444 posted on web page 1442 is the query image. Correspondingly, a recommendation panel 1446 is provided displaying top matching items available for sale by an unrelated e-commerce site or online marketplace. The first recommended item 1448 is identical to the dress that the user is interested in (e.g., image 1444).

Figure 15:
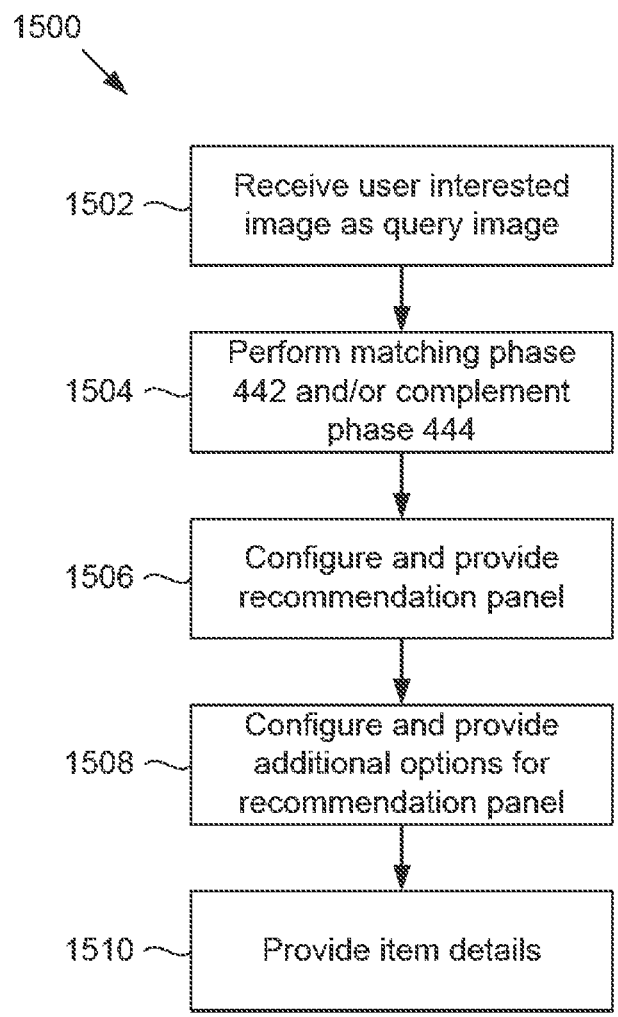
FIG. 15 illustrates an example flow diagram showing operations performed by the networked system to calculate and provide recommendation data in connection with FIGS. 13 and 14A-14E.

FIG. 15 illustrates an example flow diagram 1500 showing operations performed by the networked system 102 (e.g., application server 118) to calculate and provide recommendation data discussed in connection with FIGS. 13 and 14A-14E. At a block 1502, the networked system 102 receives the user interested image (or data equivalent) detected in block 1302 (FIG. 13). In response, the matching phase 442 and/or the complement phase 444 is performed using the user interested image as the query image (block 1504). Next at a block 1506, the recommendation panel (data) is configured and provided to the device machine 110 or 112. The recommendation panel data is received at the block 1310 (FIG. 13).

In response to detecting user interest in the recommendation panel, configure and provide additional options for the recommendation panel at a block 1508. The additional options are received at the block 1316 (FIG. 13). In response to detecting user interest in a particular item displayed in the recommendation panel, provide item details for the particular item at a block 1510. Such item details are received at the device machine 110 or 112 at block 1322 (FIG. 13).

Thus, a mechanism is provided to attract potential customers from a competitor's portal or a non-commerce portal (e.g., social network sites). Item information is also presented on an as needed basis based on the user's current intent. In alternative embodiments, other content included in a web page, such as HTML tags, text surrounding an image, cookies, and/or user profile/account information, can augment the use of an image from a web page as a query image to provide item recommendations based on user's attention on the web page image.

In this manner, image feature data extraction and uses of the image feature data are disclosed herein. In an indexing phase, inventory images corresponding to inventory items, user provided photo of an item, or an image included in a (non-affiliated) website or web page comprises input or sample images. In one embodiment, indexing is performed on the inventory images (for certain item categories such as clothing, accessories, bedding, and home furnishings) to extract their image features and attributes, and populate an image index database in which the inventory items are indexed by their image features and item categories. Extracted image features include, but are not limited to, color histogram, pattern, dominant color, and orientation histogram. In a recommendation phase (matching phase and/or complement phase), the information in the image index database is accessed when a non-inventory image is received (also referred to as a query image) in order to provide recommendations of inventory items corresponding to the query image. Recommendations (also referred to as recommendation results) comprise inventory items that best match the query image and/or inventory items that are best complements to the query image. In the case of complementary matches, fashion trends and/or pleasing color/pattern combinations are gathered from one or more sources, complementary rules are distilled from the gathered data, template images or image indices and rule triggers are generated that embody or correspond to the complementary rules, and the templates images/image indices are compared against inventory images to find complements to the query image.

In another embodiment, user preference for certain of the items provided in the recommendation results is used to re-order or re-rank the listing order of the items within the recommendation results. In still another embodiment, user's intent or interest is estimated while the user views a website/web page based on spatial attention detection. User's interest in an image included in the website/web page is used as the input, sample, or query image to return recommendation results corresponding to that image (matching and/or complementary item recommendations). The recommendation results are provided on the same website/web page without the user having to turn attention away to another page. The user can navigate within the recommendation results to view item details and purchase an item included in the recommendation results.

It is contemplated that alternative embodiments for performing matching and uses of the image feature data are possible. For example:

Apply different bin sizes of histograms for the histogram matching scheme. And/or use different distance functions to figure out which distance function works best in a class-specific sense. The distance metrics in a data-driven manner that minimizes the distance between similar items while maximizing that between dissimilar ones.

Use different local shape based features to determine which features are best suited for which item class. Furthermore, the local shape based features are selected for particular item categories that specifically work well for them.

Automatically detecting logos of different manufacturers on their product. Different detection methods include, but not limited to, template based matching, local shape detector based matching, and ensemble based matching methods.

Many products can be uniquely identified based on the text that might be present on them. Thus, include an optical character recognition engine designed to detect text and other alpha-numeric characters on a product image.

Personalization of search results—Instead of returning the same results for a particular query image independent of the user, make search process more personalized, and return search results that best suites the taste of the user interested in a particular query. This would require some form of result re-ranking done in an active learning setup.

Detecting the style of a particular query image is relevant for generating good similarity results, particularly for a fashion app. Perform some basic style detection automatically, so that the user is presented with the most likely categories from which the query object might belong to. Apply different classification and object recognition schemes, possibly different schemes for different item categories.

Here the idea is that the user gets a list of results. By using the gyroscope feature of the mobile device (e.g., smartphone or tablet), a new set of items from the ones shown can be provided in response to detection of a shaking motion. Additionally, by using the dimensions of the shake along different axes—X direction, Y direction, or Z direction—re-sorts can be performed along a predetermined respective dimension like color, texture, or shape.

Suppose a user finds an everyday item with pleasing colors and/or patterns. Examples of these everyday items could be a painting, a car, or even a pet. She wants to know if there are clothes at a given e-commerce site or online marketplace that appear similar to the everyday item of interest. She takes a picture of the item of interest using a smart phone, and uses the app (e.g., app 905) provided by the given e-commerce site or online marketplace to automatically obtain items that look similar to the everyday item. These results are organized according to their respective categories, and the user can choose a particular category to explore the matching items of different classes of objects.

This use case is for the situation where a user has a clothing apparel (e.g. a skirt or a top), and wants to find complementing accessories for that clothing item (e.g., a matching scarf, or a hat). She takes a picture of the item of the existing clothing apparel, and uses the app (e.g., app 905) to search what items are available on the given e-commerce site or online marketplace that look similar to the existing clothing apparel. Based on the similarity between the visual features of the input image and the inventory items, the app returns items matching the existing clothing apparel. The user can choose a particular category to explore the matching items of different accessory categories.

Consider the scenario where a user visits a clothing store, and finds an interesting item. She wants to check prices of similar looking items at a given e-commerce site or online marketplace. She uses a mobile device (e.g., smartphone) to take a photo of the interesting item in the store and launch the app (e.g., app 905) to view items available at the given e-commerce site or online marketplace that look similar to the item of interest in the clothing store.

Celebrity's choice of clothing is usually considered a fashion statement, and many people want to dress like celebrities. This use case is for situations where a user wants to dress like a celebrity. The user can either take a picture of an existing image where the celebrity is wearing the dress of interest, or if they have the image already in the phone, they can upload it directly. Based on the similarity between the visual features of the input image and the inventory items, the app (e.g., app 905) returns items matching the celebrity's clothes. The user can choose a particular category to explore the similar items of different clothing categories. This use case can be also used with an automatic face recognition technology, which would recognize the face of the celebrity, and show results that match the flavor of the celebrity's style.

Consider a scenario where a seller wants to sell their clothes in an online marketplace. To make the process of filling out the details of the clothes more efficient, the seller uploads an image of the piece of clothing to be sold. The app (e.g., app 905) finds the best matches for this item based on visual similarity, and shows the results to the seller. The seller can now select the item that has the exact match with the item to be sold. Given this information, the system can auto-fill most of the fields for the seller to make the process of transferring information about the item to be sold more efficient.

Figure 16:
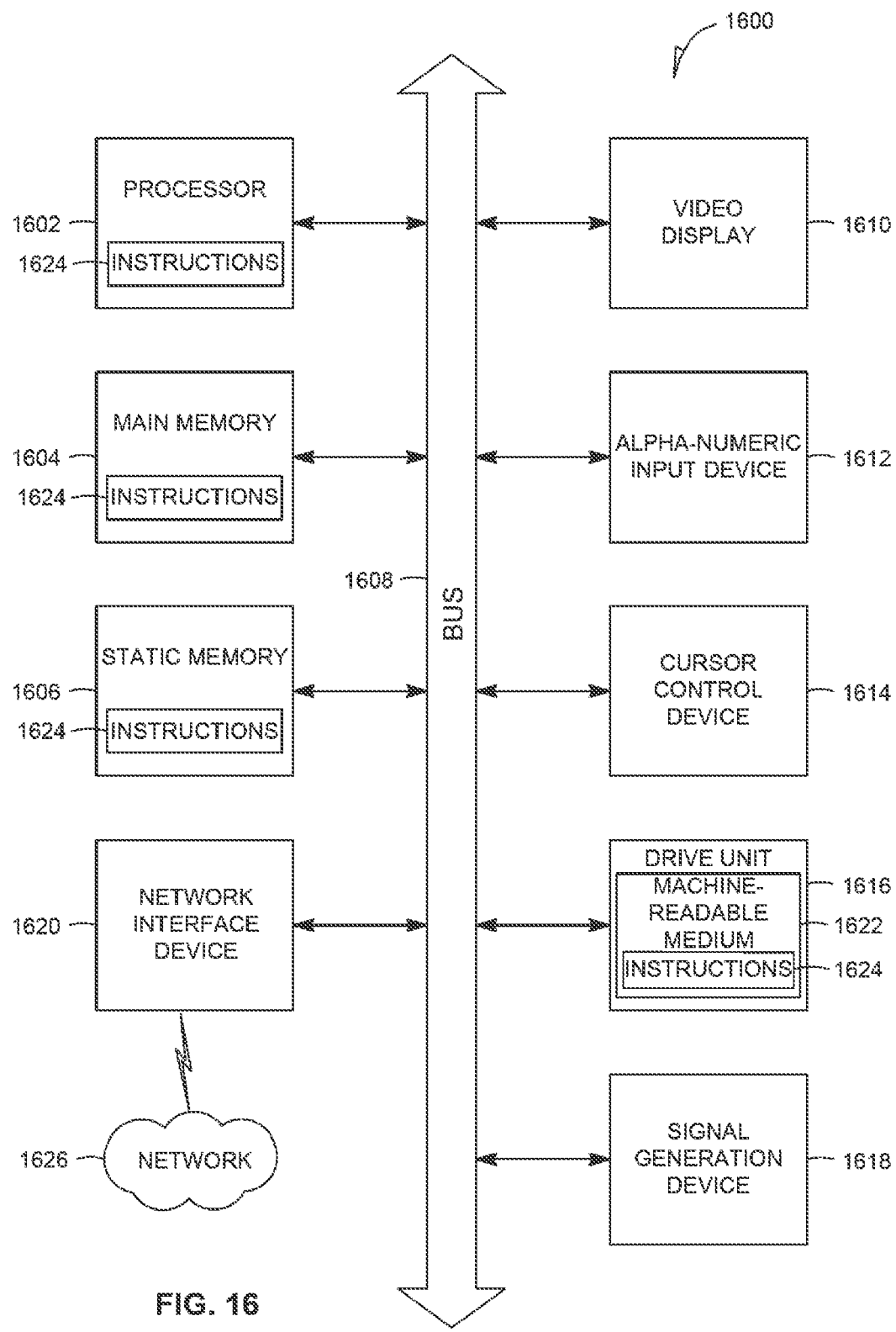
FIG. 16 illustrates a diagrammatic representation of a machine in the example form of a computer system within which a set of instructions, for causing the machine to perform any one or more of the methodologies of FIGS. 4, 6-8, 10-11, 13, and 15 according to some embodiments.

FIG. 16 shows a diagrammatic representation of a machine in the example form of a computer system 1600 within which a set of instructions, for causing the machine to perform any one or more of the methodologies discussed herein, may be executed. The computer system 1600 comprises, for example, any of the device machine 110, device machine 112, applications servers 118, API server 114, web server 116, database servers 124, or third party server 130. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU), or both), a main memory 1604 and a static memory 1606, which communicate with each other via a bus 1608. The computer system 1600 may further include a video display unit 1610 (e.g., liquid crystal display (LCD), organic light emitting diode (OLED), touch screen, or a cathode ray tube (CRT)). The computer system 1600 also includes an alphanumeric input device 1612 (e.g., a physical or virtual keyboard), a cursor control device 1614 (e.g., a mouse, a touch screen, a touchpad, a trackball, a trackpad), a disk drive unit 1616, a signal generation device 1618 (e.g., a speaker) and a network interface device 1620.

The disk drive unit 1616 includes a machine-readable medium 1622 on which is stored one or more sets of instructions 1624 (e.g., software) embodying any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, at a networked system from an application installed on a device of a user, a query image captured by the device via the application;
   performing, by the networked system, image processing to extract a color histogram of an item depicted in the query image;
   identifying, by a hardware processor of the networked system, a dominant color of the item depicted in the query image, the dominant color being a color that is present on a most spatial area of the item relative to any other color of the item;
   comparing, by the networked system, the color histogram of the item depicted in the query image with a color histogram of an image of each of a plurality of available items or the dominate color of the item depicted in the query image with a dominate color of the image of each of a plurality of available items;
   based on the comparing, identifying, by the networked system, item recommendations of the available items that closely match the item depicted in the query image; and
   causing presentation of the item recommendations on the device of the user.

2. The method of claim 1, further comprising determining a dominate color confidence score using the color histogram of the query image.

3. The method of claim 2, wherein the comparing comprises:
   comparing, by the networked system, the color histogram of the item depicted in the query image with the color histogram of the image of each of the plurality of available items based on the dominate color confidence score being low, or
   comparing, by the networked system, the dominate color of the item depicted in the query image with a dominate color of the image of each of a plurality of available items based on the dominate color confidence score being high.

4. The method of claim 1, wherein the identifying the dominant color comprises re-using hue values from the color histogram and identifying a bin within a bin group corresponding to the hue values that has a highest peak.

5. The method of claim 1, further comprising providing the application for installation on the device of the user, the application including camera capabilities that configure the device to capture the query image, the application transmitting the query image to the networked system.

6. The method of claim 1, further comprising:
   receiving, by the networked system from the remote device, a selection of a recommendation from the item recommendations; and in response to receiving the selection of the recommendation, causing display of item details and an image of the selected recommendation on the user interface of the remote device.

7. The method of claim 6, further comprising, in response to receiving the selection of the recommendation,
determining a set of refined recommendations; and
causing display of the set of refined recommendations on the user interface displaying the item details and the image of the selected recommendation.

8. A system comprising:
one or more hardware processors; and
a memory storing instructions that, when executed by one or more hardware processors, causes the one or more hardware processors to perform operations comprising:
receiving, from an application installed on a device of a user, a query image captured by the device via the application;
performing image processing to extract a color histogram of an item depicted in the query image;
identifying a dominant color of the item depicted in the query image, the dominant color being a color that is present on a most spatial area of the item relative to any other color of the item;
comparing the color histogram of the item depicted in the query image with a color histogram of an image of each of a plurality of available items or the dominate color of the item depicted in the query image with a dominate color of the image of each of a plurality of available items;
based on the comparing, identifying item recommendations of the available items that closely match the item depicted in the query image; and
causing presentation of the item recommendations on the device of the user.

9. The system of claim 8, wherein the operations further comprise determining a dominate color confidence score using the color histogram of the query image.

10. The system of claim 9, wherein the comparing comprises:
comparing, by the networked system, the color histogram of the item depicted in the query image with the color histogram of the image of each of the plurality of available items based on the dominate color confidence score being low, or
comparing, by the networked system, the dominate color of the item depicted in the query image with a dominate color of the image of each of a plurality of available items based on the dominate color confidence score being high.

11. The system of claim 8, wherein the identifying the dominant color comprises re-using hue values from the color histogram and identifying a bin within a bin group corresponding to the hue values that has a highest peak.

12. The system of claim 8, wherein the operations further comprise providing the application for installation on the device of the user, the application including camera capabilities that configure the device to capture the query image, the application transmitting the query image to the networked system.

13. The system of claim 8, wherein the operations further comprise:
receiving, by the networked system from the remote device, a selection of a recommendation from the item recommendations; and
in response to receiving the selection of the recommendation, causing display of item details and an image of the selected recommendation on the user interface of the remote device.

14. The system of claim 13, wherein the operations further comprise, in response to receiving the selection of the recommendation,
determining a set of refined recommendations; and
causing display of the set of refined recommendations on the user interface displaying the item details and the image of the selected recommendation.

15. A non-transitory machine-readable medium storing instructions that, when executed by one or more hardware processors of a machine, causes the machine to perform operations comprising:
receiving, from an application installed on a device of a user, a query image captured by the device via the application;
performing image processing to extract a color histogram of an item depicted in the query image;
identifying a dominant color of the item depicted in the query image, the dominant color being a color that is present on a most spatial area of the item relative to any other color of the item;
comparing the color histogram of the item depicted in the query image with a color histogram of an image of each of a plurality of available items or the dominate color of the item depicted in the query image with a dominate color of the image of each of a plurality of available items;
based on the comparing, identifying item recommendations of the available items that closely match the item depicted in the query image; and
causing presentation of the item recommendations on the device of the user.

16. The non-transitory machine-readable medium of claim 15, wherein the operations further comprise determining a dominate color confidence score using the color histogram of the query image.

17. The non-transitory machine-readable medium of claim 16, wherein the comparing comprises:
comparing, by the networked system, the color histogram of the item depicted in the query image with the color histogram of the image of each of the plurality of available items based on the dominate color confidence score being low, or
comparing, by the networked system, the dominate color of the item depicted in the query image with a dominate color of the image of each of a plurality of available items based on the dominate color confidence score being high.

18. The non-transitory machine-readable medium of claim 15, wherein the operations further comprise providing the application for installation on the device of the user, the application including camera capabilities that configure the device to capture the query image, the application transmitting the query image to the networked system.

19. The non-transitory machine-readable medium of claim 15, wherein the operations further comprise:
receiving, by the networked system from the remote device, a selection of a recommendation from the item recommendations; and
in response to receiving the selection of the recommendation, causing display of item details and an image of the selected recommendation on the user interface of the remote device.

20. The non-transitory machine-readable medium of claim 19, wherein the operations further comprise, in response to receiving the selection of the recommendation, determining a set of refined recommendations; and
causing display of the set of refined recommendations on the user interface displaying the item details and the image of the selected recommendation.

* * * * *